(12) United States Patent
Chang et al.

(10) Patent No.: US 10,008,030 B2
(45) Date of Patent: Jun. 26, 2018

(54) METHOD AND APPARATUS FOR GENERATING IMAGES

(71) Applicant: Samsung Electronics Co., Ltd., Suwon-si, Gyeonggi-do (KR)

(72) Inventors: Hyun Sung Chang, Seoul (KR); Young Ju Jeong, Yongin-si (KR); Hyoseok Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days. days.

(21) Appl. No.: 15/252,863

(22) Filed: Aug. 31, 2016

(65) Prior Publication Data

US 2017/0069128 A1 Mar. 9, 2017

(30) Foreign Application Priority Data

Sep. 7, 2015 (KR) .......................... 10-2015-0126198
Jan. 13, 2016 (KR) .......................... 10-2016-0004117

(51) Int. Cl.
*G06T 15/50* (2011.01)
*H04N 13/04* (2006.01)
*G06T 7/30* (2017.01)

(52) U.S. Cl.
CPC ............. *G06T 15/50* (2013.01); *G06T 7/30* (2017.01); *H04N 13/0402* (2013.01);
(Continued)

(58) Field of Classification Search
None
See application file for complete search history.

(56) References Cited

U.S. PATENT DOCUMENTS 5,767,987 A 6/1998 Wolff et al.
6,567,570 B1 5/2003 Steinle et al.
(Continued)

FOREIGN PATENT DOCUMENTS

KR 2007/0016909 A 2/2007
WO WO-2013/028201 A1 2/2013

OTHER PUBLICATIONS

Ken Mashitani et al. "Multi-view glass-less 3-D Display by Parallax Barrier of Step Structure." *Memoirs of the Faculty of Engineering Osaka City University* 48 (2007): pp. 1-8.
(Continued)

*Primary Examiner* — Michelle Chin
(74) *Attorney, Agent, or Firm* — Harness, Dickey & Pierce, P.L.C.

(57) ABSTRACT

A panel image that may be displayed in a display apparatus to display a 3D image that includes reduced differences with a source image may be generated based on generating a predicted 3D image based on a panel image, comparing the predicted 3D image to the source image, and adjusting the panel image to reduce differences between the predicted 3D image and the source image. Such a process may be performed iteratively. The predicted 3D image may be generated based on applying a convolution kernel to the panel image in a convolution operation. The convolution kernel may be based on a first function and a second function. The first function may be associated with a brightness distribution of one or more visual fields of the panel image. The second function may be associated with a Gaussian distribution of brightness of a panel image pixel.

38 Claims, 21 Drawing Sheets

(52) U.S. Cl.
    CPC ..... *H04N 13/0425* (2013.01); *H04N 13/0447* (2013.01); *H04N 13/0475* (2013.01); *G06T 2207/10004* (2013.01)

(56) References Cited

U.S. PATENT DOCUMENTS

| | | | |
|---|---|---|---|
| 2004/0100464 A1* | 5/2004 | Oh | G06T 15/10 |
| | | | 345/419 |
| 2005/0052529 A1 | 3/2005 | Mashitani et al. | |
| 2013/0250193 A1* | 9/2013 | Yun | G02B 27/22 |
| | | | 349/15 |
| 2013/0251265 A1 | 9/2013 | Chehaiber | |
| 2014/0204360 A1* | 7/2014 | Dowski, Jr. | G05D 1/101 |
| | | | 356/4.01 |
| 2014/0210816 A1 | 7/2014 | Zimmermann | |
| 2015/0055884 A1 | 2/2015 | Venkataraman et al. | |
| 2015/0062154 A1 | 3/2015 | Ellis et al. | |
| 2015/0245008 A1 | 8/2015 | Hyodo | |

OTHER PUBLICATIONS

Xiaoyan Wang et al. "Improved Crosstalk Reduction on Multiview 3D Display by Using BILS Algorithm." *Journal of Applied Mathematics* 2014 (2014): pp. 1-13.

Vikas Ramachandra et al. "Spatioangular Prefiltering for Multiview 3D Displays". IEEE Transactions on Visualization and Computer Graphics, vol. 17, No. 5. IEEE Computer Society. May 2011.

Xiao-Fang Li et al. "Image Processing to Eliminate Crosstalk Between Neighboring View Images in Three-Dimensional Lenticular Display". Journal of Display Technology, vol. 7, No. 8, IEEE. Aug. 2011.

Extended European Search Report dated Dec. 13, 2016 issued in corresponding European Patent Application No. 16187659.4.

* cited by examiner

510

METHOD AND APPARATUS FOR GENERATING IMAGES

CROSS-REFERENCE TO RELATED APPLICATIONS

This application claims under 35 U.S.C. § 119 to Korean Patent Application No. 10-2015-0126198 filed on Sep. 7, 2015, and Korean Patent Application No. 10-2016-0004117 filed on Jan. 13, 2016, in the Korean Intellectual Property Office, the entire contents of which are incorporated herein by reference in its entirety.

BACKGROUND

1. Field

At least one example embodiment relates to generating images.

2. Description of the Related Art

In some cases, three-dimensional (3D) images may be provided to a viewer (also referred to herein as a "user") from a light field apparatus. A light field apparatus may provide 3D images to the user based on generating a stereoscopic image such that different images of a scene are displayed to separate eyes of the user, such that the user perceives a 3D view of the scene.

In some cases, displaying different images to the separate eyes of the user may include directing different light fields towards separate eyes of the user, where the different light fields correspond to the different images. The different light fields may be directed to the separate user eyes using a glass-type method that includes filtering using polarization-based division, time division, and wavelength division for varying a wavelength of a primary color. The different light fields may be directed to the separate user eyes using a glassless-type method of allowing each image to be viewed only in a certain space using a three-dimensional (3D) converter such as a parallax barrier, a lenticular lens, and a directional backlight unit (BLU).

SUMMARY

At least one example embodiment relates to an image generating method.

In at least one example embodiment, the method may include determining a first function associated with a brightness distribution of one or more visual fields of a two-dimensional (2D) panel image, determining a second function associated with a Gaussian distribution of brightness of a panel image pixel based on distance from the panel image pixel, and generating a three-dimensional (3D) image based on the panel image, the first function, and the second function. The panel image may include a plurality of panel image pixels emitting a plurality of visual fields. The first function may include a normal distribution of observed panel image pixel relative brightness based on observed visual field of the plurality of visual fields. The 3D image may include a plurality of images corresponding to separate visual fields of the panel image.

The panel image may be generated based on a source image, the source image including a plurality of images corresponding to the separate visual fields, and the method may further include adjusting one or more panel image pixel values of the panel image based on a difference between one or more pixel values of the source image and one or more pixel values of the 3D image. The method may include generating a convolution kernel based on the first function and the second function, generating a predicted 3D image based on the panel image and the convolution kernel, and adjusting one or more pixel values of the panel image to reduce a determined difference between pixel values of the source image and pixel values of the 3D image. An initial value of the panel image may be determined by applying a fractional view trick method to the source image.

The first function may include a view profile function, and the second function may include a point spread function.

At least one example embodiment relates to an image generating method.

In at least one example embodiment, the method may include obtaining a first cost function associated with a difference between pixel values of a source image of a two-dimensional (2D) panel image and pixel values of a three-dimensional (3D) image of the panel image, and adjusting one or more pixel values of the panel image based on the first cost function to reduce a difference between the pixel values of the source image and the pixel values of the 3D image. The panel image may include a plurality of panel image pixels emitting a plurality of visual fields. The source image may include a plurality of images corresponding to the separate visual fields. The 3D image may include a plurality of images corresponding to separate visual fields.

The adjusting of the panel image may include adjusting values of pixels included in the panel image to reduce the first cost function. The first cost function may include a least-squares error between the pixel values of the source image and the pixel values of the 3D image. The first cost function may include a second cost function associated with an artifact in the 3D image. The second cost function may be determined based on a variation in pixel values of pixels included in the 3D image.

The source image may include separate sets of images, each of the sets of images being associated with separate viewing distances from a display apparatus displaying the visual fields. The method may further include determining initial pixel values of the panel image based on sampling pixel values of each visual field of the source image. The source image and the 3D image may be a light field image.

The method may further include generating a predicted 3D image based on a first function associated with a brightness distribution of one or more visual fields of the panel image and a second function associated with a Gaussian distribution of brightness of a panel image pixel based on distance from the panel image pixel. The method may include generating the predicted 3D image based on a convolution operation including the panel image, the first function, and the second function.

The first function may include a view profile function, and the second function may include a point spread function.

At least one example embodiment relates to an image generating method.

In at least one example embodiment, the method may include receiving a source image, the source image including a plurality of visual fields, rendering a two-dimensional (2D) panel image based on the source image, the panel image including a plurality of panel image pixels emitting a plurality of visual fields, and iteratively adjusting pixel values of the panel image based on pixel values of the source image and a predicted 3D image generated based on the panel image, the predicted 3D image being generated based on a convolution kernel corresponding to a 3D display apparatus.

The source image may be a 3D image for a plurality of visual fields. The convolution kernel may be determined based on a first function associated with a brightness distribution of one or more visual fields of the panel image and a second function associated with a Gaussian distribution of brightness of a panel image pixel based on distance from the panel image pixel, the panel image including a plurality of panel image pixels emitting a plurality of visual fields, the first function including a normal distribution of observed panel image pixel relative brightness based on observed visual field of the plurality of visual fields.

The iterative adjusting of the panel image may include generating a predicted 3D image based on the convolution kernel, and adjusting one or more pixel values of the panel image to reduce a determined difference between pixel values of the source image and pixel values of the 3D image.

The determining of the panel image based on the source image may include determining initial pixel values of the panel image based on applying a fractional view trick method to the source image.

The iterative adjusting of the panel image may include adjusting one or more pixel values of the panel image to reduce a cost function associated with a difference between pixel values of the source image and pixel values of the 3D image. The cost function may include at least one of a first functional element associated with a least-squares error between the pixel values of the source image and the pixel values of the 3D image and a second functional element associated with an artifact in the 3D image.

The method may further include estimating a viewing distance of a user from a display apparatus displaying the panel image, and determining the convolution kernel based on the estimated viewing distance.

At least one example embodiment relates to an image generating apparatus.

In at least one example embodiment, the apparatus may include a memory configured to store a two-dimensional (2D) panel image, the panel image including a plurality of panel image pixels emitting a plurality of visual fields, and a processor configured to determine a cost function associated with a difference between pixel values of a source image and pixel values of a three-dimensional (3D) image of the panel image and adjust one or more pixel values of the panel image based on the determined cost function.

The processor may adjust one or more pixel values of the panel image to reduce the difference between pixel values of the source image and pixel values of the 3D image of the panel image. The cost function may include at least one of a first function associated with a least-squares error between the pixel values of the source image and the pixel values of the 3D image and a second function associated with an artifact in the 3D image. The second function may be determined based on a variation in pixel values of the 3D image.

The source image may include separate sets of images, each of the sets of images being associated with separate viewing distances from a display apparatus displaying the visual fields. The processor may determine initial pixel values of the panel image based on sampling pixel values of each visual field of the source image.

The processor may generate a predicted 3D image based on a first function associated with a brightness distribution of one or more visual fields of the panel image and a second function associated with a Gaussian distribution of brightness of a panel image pixel based on distance from the panel image pixel. The processor may generate the predicted 3D image based on a convolution operation including the panel image, the first function, and the second function. The first function may include a view profile function and the second function may include a point spread function.

At least one example embodiment relates to an image generating apparatus.

In at least one example embodiment, the apparatus may include a communication module configured to receive a source image, the source image including a plurality of visual fields, and a processor configured to render a two-dimensional (2D) panel image based on the source image, the panel image including a plurality of panel image pixels emitting a plurality of visual fields and iteratively adjust pixel values of the panel image based on pixel values of the source image and a predicted 3D image generated based on the panel image, the predicted 3D image being generated based on a convolution kernel corresponding to a 3D display apparatus.

The convolution kernel may be determined based on a first function associated with a brightness distribution of one or more visual fields of the panel image and a second function associated with a Gaussian distribution of brightness of a panel image pixel based on distance from the panel image pixel, the panel image including a plurality of panel image pixels emitting a plurality of visual fields, the first function including a normal distribution of observed panel image pixel relative brightness based on observed visual field of the plurality of visual fields. The processor may generate the predicted 3D image based on the convolution kernel and adjust the pixel values of the panel image to reduce a difference between pixel values of the source image and pixel values of the 3D image. The processor may adjust one or more pixel values of the panel image to reduce a cost function associated with a difference between pixel values of the source image and pixel values of the 3D image. The cost function may include at least one of a first functional element associated with a least-squares error between the pixel values of the source image and the pixel values of the 3D image and a second functional element associated with an artifact in the 3D image.

The processor may estimate a viewing distance of a user from a display apparatus displaying the panel image and determine the convolution kernel based on the estimated viewing distance.

At least one example embodiment may include an apparatus. The apparatus may include a memory storing computer-readable instructions; and a processor configured to execute the computer-readable instructions to determine a first function associated a brightness distribution of one or more visual fields of a two-dimensional (2D) panel image, the panel image including a plurality of panel image pixels emitting a plurality of visual fields, the first function including a normal distribution of observed panel image pixel relative brightness based on observed visual field of the plurality of visual fields, determine a second function associated with a Gaussian distribution of brightness of a panel image pixel based on distance from the panel image pixel, and generate a three-dimensional (3D) image based on the panel image, the first function, and the second function, the 3D image including a plurality of images corresponding to separate visual fields of the panel image.

The processor may be configured to execute the computer-readable instructions to estimate a viewing distance of a user from a display apparatus configured to display the panel image, based on one or more images generated by a camera sensor and determine at least one of the first function and the second function based on the estimated viewing distance.

The processor may be configured to execute the computer-readable instructions to dynamically adjust the estimated viewing distance based on processing a stream of images generated by the camera sensor and dynamically adjust at least one of the first function and the second function based on the dynamically adjusted estimated viewing distance.

At least one example embodiment may play a stereoscopic image in a glassless-type method, and thus reduce inconvenience that may be experienced by wearing glasses in a glass-type method. According to at least one example embodiment, a plurality of views may be allocated to a panel image to be output to a display panel. At least one example embodiment may provide technology for inhibiting, easing, and reducing and/or preventing issues, for example, degradation of a resolution at each view due to division of a panel image by each view, a black matrix that may occur in a space among pixels for each view, degradation of a quality of a 3D image due to a crosstalk between views, and a limited number of views for a 3D image, in comparison to a general glassless-type method of playing a stereoscopic image.

Additional aspects of example embodiments will be set forth in part in the description which follows and, in part, will be apparent from the description, or may be learned by practice of the disclosure.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
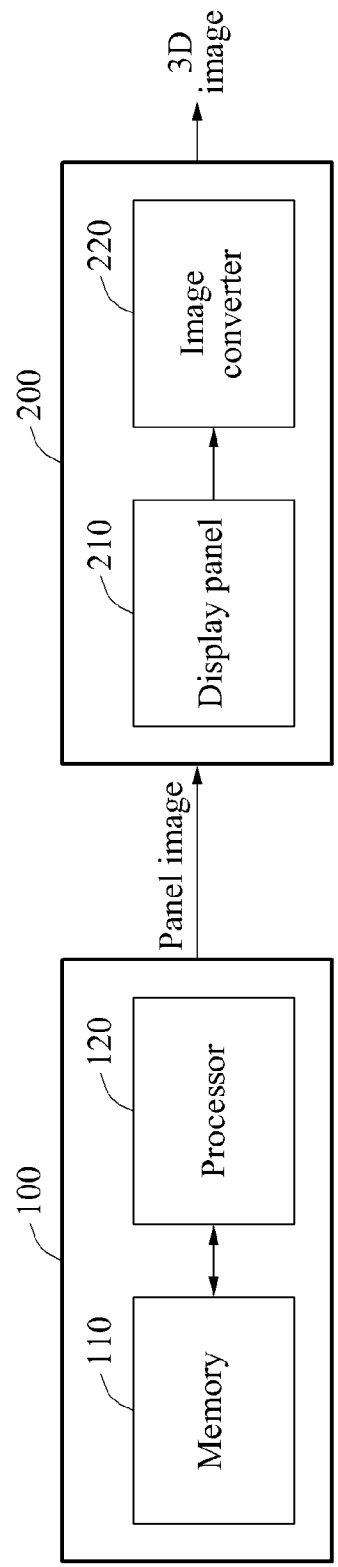
FIG. 1 is a diagram illustrating an image generating apparatus and a three-dimensional (3D) display apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments to be described hereinafter may be applicable to modeling of a three-dimensional (3D) image. For example, the example embodiments may be used to improve a quality of the 3D image.

FIG. 1 is a diagram illustrating an image generating apparatus 100 and a 3D display apparatus 200 according to at least one example embodiment.

Referring to FIG. 1, the image generating apparatus 100 includes a memory 110 and a processor 120. The 3D display apparatus 200 includes a display panel 210 and an image converter 220. The image generating apparatus 100 may transmit a panel image to the 3D display apparatus 200. A panel image includes a two-dimensional image that is provided to the 3D display apparatus 200 such that the panel image is displayed on the display panel 210. The 3D display apparatus 200 may output a 3D image based on the panel image. To output the 3D image based on the panel image, the 3D display apparatus 200 may display the panel image on the display panel 210 such that the display panel 210 emits a light field to the image converter 220. The image converter 220 receives and converts the light field emitted by the display panel into one or more light fields corresponding to the 3D image. The image converter 220 directs the one or more light fields into an exterior of the 3D display apparatus 200, where the one or more light fields may be perceived by a user. The image converter 220 may include one or more various image converters. For example, the image converter 220 may include at least one of a parallax barrier, a lenticular lens, and a directional backlight unit (BLU).

The panel image indicates a planar image output to the display panel 210. The 3D image indicates a stereoscopic image obtained from the panel image converted through the image converter 220. Here, an operation of generating the panel image for the display panel 210 is referred to as a rendering operation, and thus the image generating apparatus 100 may also be referred to as a rendering apparatus.

Although the image generating apparatus 100 is provided separately from the 3D display apparatus 200, the image generating apparatus 100 may be included in the 3D display apparatus 200. For example, the 3D display apparatus 200 may include a processor and a memory, and the processor and the memory included in the 3D display apparatus 200 may be construed as the image generating apparatus 100.

The processor 120 may adjust the panel image to improve a quality of the 3D image. Adjusting a panel image may include adjusting one or more pixel values of one or more pixels of the panel image. As referred to herein, a pixel value of a pixel may include one or more of a depth value, brightness value, RGB value, color value, some combination thereof, or the like. The processor 120 may be configured in various ways as, for example, a single processor, a multi-processor, a hardware accelerator (HWA), or a combination thereof. Although described in detail later, the processor 120 may predict the 3D image to be viewed by a user based on a convolution kernel. In addition, the processor 120 may adjust the panel image to reduce a difference between a source image, or an original image, of the panel image and the predicted 3D image. Such an operation will be described in more detail later.

The memory 110 may store the panel image, the source image of the panel image, and the predicted 3D image. The processor 120 may obtain, from the memory 110, the panel image, the source image of the panel image, and the predicted 3D image. The memory 110 may store data such as, for example, various functions, equations, and operation results, for operations of the processor 120. The processor 110 may then use the data stored in the memory 110.

The image converter 220 may convert the panel image to the 3D image. The image converter 220 may include, for example, a parallax barrier, a lenticular lens, and a directional backlight unit (BLU). The image converter 220 may control a direction in which light to be output through the display panel 210 is transmitted. For example, the image converter 220 may output the panel image to a plurality of visual fields. Through the image converter 220, a plurality of views or light fields may be generated. Such an image conversion process will be described in detail with reference to FIGS. 2A and 2B.

In some example embodiments, an image generating apparatus 100 may generate different panel images for different image converters 220. The image generating apparatus 100 may be communicatively coupled to multiple different image converters 220. The image generating apparatus 100 may store information indicating separate individual characteristics of the different image converters 220. Accordingly, in some example embodiments, the image generating apparatus 100 may generate separate panel images for each of the image converters 220, based on a common source image, where each separate panel image is generated according to the one or more individual characteristics of a particular one of the multiple image converters 220.

Figure 2A:
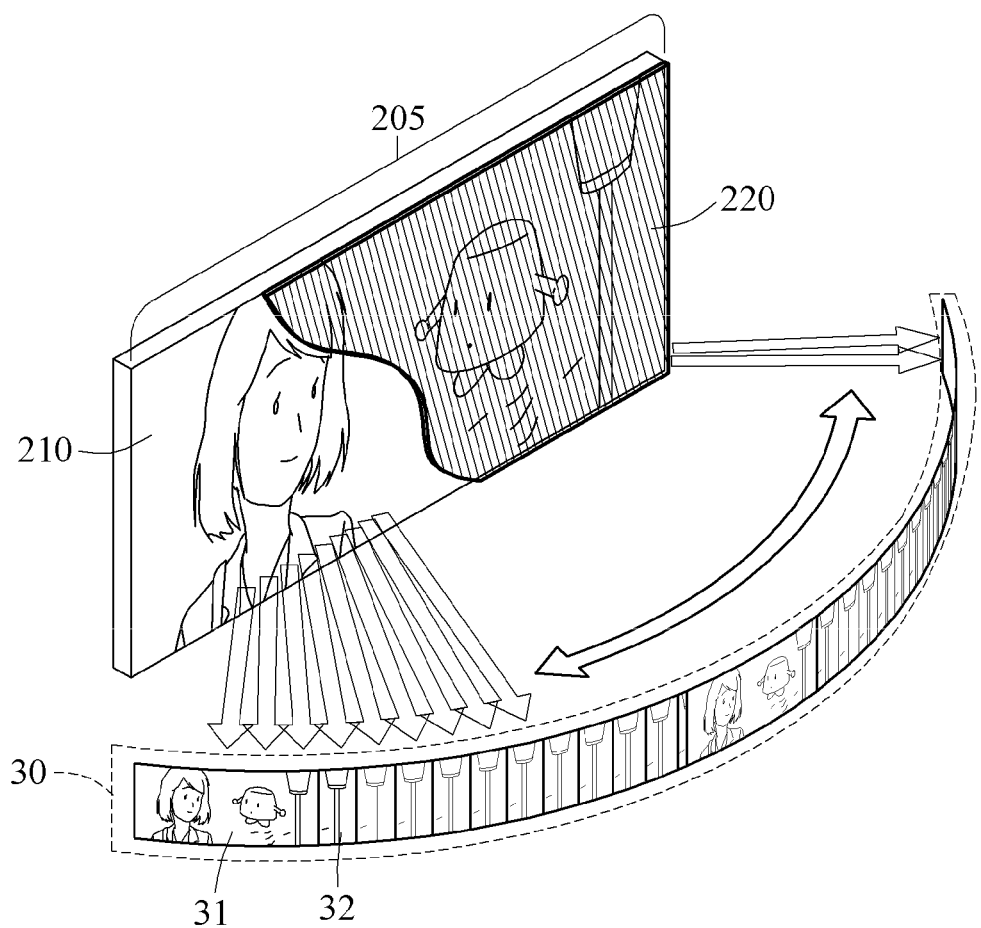
FIG. 2A and FIG. 2B illustrate an image conversion process according to at least one example embodiment.
Figure 2B:
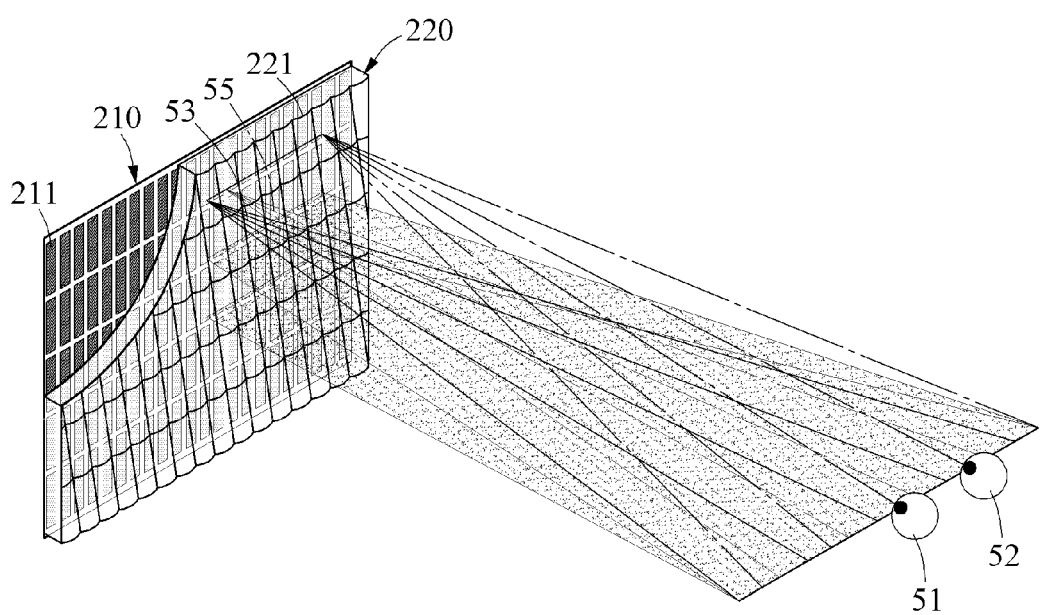

FIGS. 2A and 2B illustrate an image conversion process according to at least one example embodiment. Referring to FIG. 2A, the image converter 220 may convert, to a 3D image 30, a panel image 205 output to ("displayed by") the display panel 210. The 3D image 30 may include images corresponding to a plurality of views of a 3D scene. For example, as illustrated in FIG. 2A, a first image 31 may correspond to a first view of a scene, and a second image 32 may correspond to a second view of the scene. An area in which an image corresponding to each view is viewable is referred to as a visual field. Thus, an area in which the first image 31 corresponding to the first view is viewable is referred to as a first visual field, and an area in which the second image 32 corresponding to the second view is viewable is referred to as a second visual field. For example, as shown in FIG. 2B, the first image 31 may be viewable in a first visual field 53, and the second image 32 may be viewable in a second visual field 55

Through a multi-view display method, images of different views may be radiated (e.g., emitted, directed, etc.) to separate eyes of a user, and thus the user may experience a 3D effect based on observing a stereoscopic image of a scene. For example, as shown in FIG. 2B, a left eye 51 of the user may be within a first visual field 53 and a right eye 52 of the user may be within a second visual field 55. Thus, the user may view the first image 31 with a left eye 51 and the second image 32 with a right eye 52, and thus experience a 3D effect from the 3D image 30.

The "3D effect" may refer to a user observing a stereoscopic image of a scene. The 3D effect may include an effect from a binocular parallax, where separate user eyes observe separate view fields corresponding to separate views of a 3D image, such that the user perceives a stereo representation of a scene included in the 3D image. Such a 3D effect may be referred to as a "3D spatial impression" of the scene. To generate the 3D image 30, the rendering apparatus 100 may determine pixel values of pixels included in the panel image displayed by the display panel 210 based on the various images corresponding to the views in the 3D image displayed based on the image converter 220 converting the panel image displayed by the display panel 210.

Referring to FIG. 2B, the image converter 220 may emit rays of light output (emitted) through pixels of the display panel 210 to be evenly spread to a 3D space. Such a method designed for all the rays to be evenly spread by a panel image may be referred to as a light field display method. The image converter 220 may include a parallax barrier or a lenticular lens. A parallax barrier or lenticular lens included in the image converter 220 may be configured to obliquely cross a pixel array included in the display panel 210, as shown in FIG. 2B. As shown in FIG. 2B, an image converter 220 that is configured to obliquely cross a pixel array includes an array of lenses 221 that are angled relative to the pixels 211 of the pixel array of the display panel 210.

As described in the foregoing, a plurality of views may be allocated to a panel image. Allocating a plurality of view to a panel image may include rendering a panel image such that the image converter 220 converts the light field emitted by the display panel 210 into a plurality of visual fields corresponding to the plurality of views if and/or when the panel image is displayed by the display panel 210. In some example embodiments, allocating the plurality of views includes rendering a panel image that is configured to be displayed in a "pattern of view allocation" according to the pixels 211 in a pixel array of the display panel 210 where light emitted by certain pixels of the panel image are directed to certain visual fields comprising the 3D image. A method of allocating the views may relate closely to a quality of a 3D image. For example, the quality of the 3D image may be affected by the number of views included in the panel image and a pattern of view allocation to the panel image. Such a view allocation will be described in detailed with reference to FIGS. 3A and 3B.

Figure 3A:
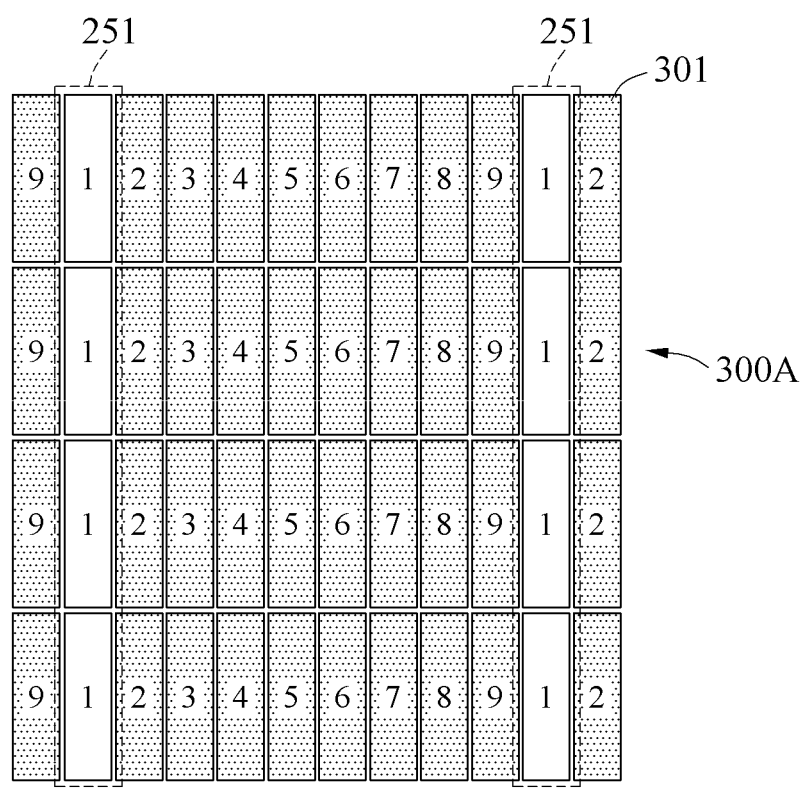
FIG. 3A, FIG. 3B, and FIG. 3C illustrate view allocation according to at least one example embodiment.
Figure 3B:
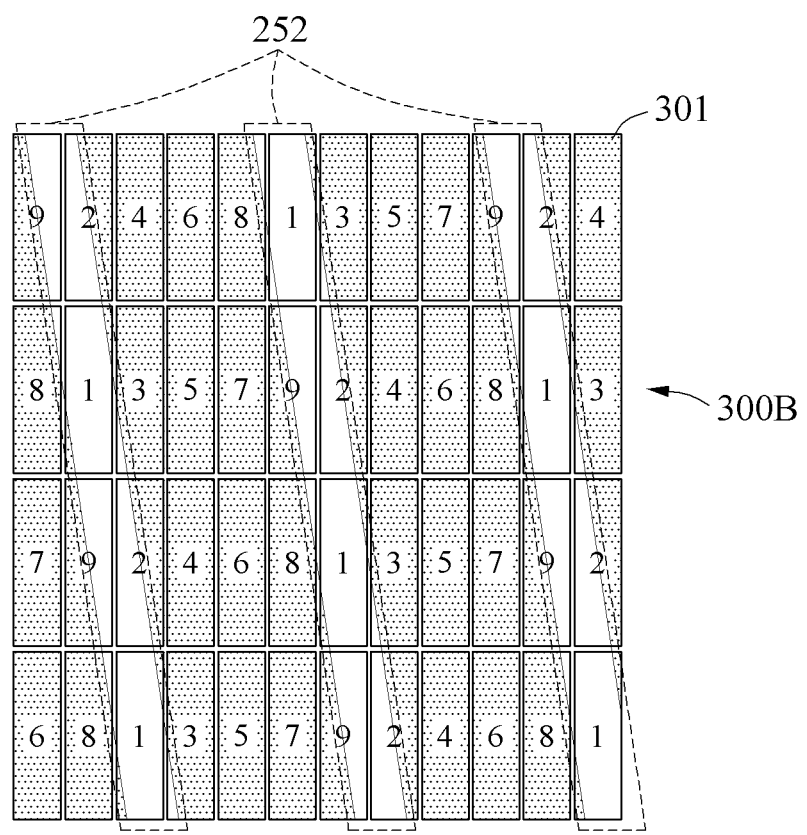
Figure 3C:
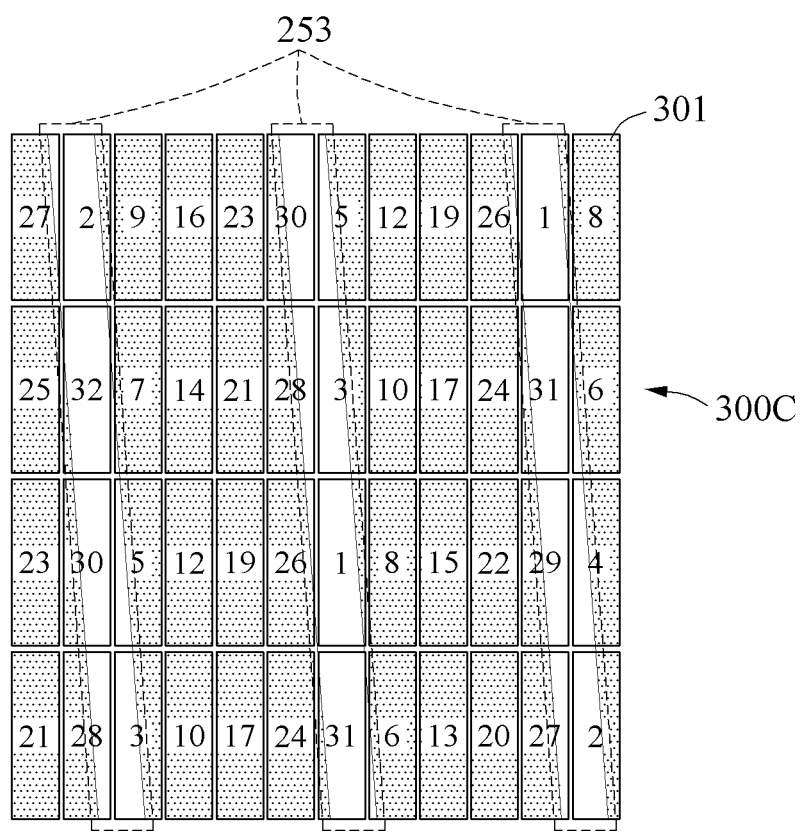

FIG. 3A, FIG. 3B, and FIG. 3C illustrate view allocation according to at least one example embodiment. In FIG. 3A, FIG. 3B, and FIG. 3C, a portion of a panel image is illustrated. A plurality of pixels 301 included in the panel image 300A-C may be allocated to a plurality of views. Referring to FIGS. 3A and 3B, pixels 301 of the panel image 300A-B are allocated to first through ninth views. Referring to FIG. 3C, pixels 301 of the panel image 300C are allocated to first through 32th views. When the number of the allocated views increases, a 3D spatial impression may increase due to a binocular parallax. An increase in a 3D spatial impression according to an increase in the number (quantity) of allocated views may refer to an improved 3D spatial impression of a scene in a 3D image based on an increased number (quantity) of separate views of the scene.

An image converter may output ("convert") an emitted light field of a displayed panel image to a plurality of visual fields. Such outputting may include splitting the light field emitted by various sets of pixels 301 in various areas of the panel image 300A-C into separate visual fields according to separate sets of pixels of the panel image. For example, the image converter may output the panel image to the visual fields through a parallax barrier, a lenticular lens, or a directional BLU. Referring to FIGS. 3A, 3B, and 3C, areas of the panel images 300A-C, for example, an area 251 of the panel image 300A in FIG. 3A, an area 252 of the panel image 300B in FIG. 3B, and an area 253 of the panel image 300C in FIG. 3C, include pixels corresponding to a first view. The image converter may output ("convert") the light emitted by the pixels of the areas 251, 252, and 253 to a first visual field. As described in the foregoing, the image converter may output light emitted by pixels of each view to a corresponding visual field.

Apparatus 100 may "allocate" a view to a plurality of pixels included in a panel image based on various patterns. The pixels may be output to a corresponding visual field based on the patterns. Referring to FIGS. 3B and 3C, views may be allocated to be suitable for a parallax barrier in which a slit is designed to be diagonally disposed or a lenticular lens in which a central line is designed to be diagonally disposed. In such an example, a decrease in a resolution that may occur in a lateral direction may be reduced and/or prevented, and a black matrix between visual fields may be reduced, based on a direction of the slits being a diagonal direction, relative to the direction being a longitudinal direction. In addition, brightness nonuniformity of visual fields may be reduced. In addition, a pixel of a neighboring visual field may also be observed in addition to a pixel of a visual field, and thus a resolution may increase. Allocating a view to pixels of a panel image based on various patterns may include the image converter being configured to direct light emitted by a given pattern of pixels to a particular visual field. In addition, based on viewing a visual field and one or more neighboring visual fields may result in an increase in image resolution to the viewing user, relative to viewing the visual field without the neighboring visual fields, as an individual visual field may have a lower resolution than the original image.

As described in the foregoing, an increase in the number of views allocated to a panel image may enhance a 3D effect of a 3D image. However, when the views increase, resolutions of images corresponding to the views may decrease and a resolution of the 3D image may also decrease. Such a degradation of a resolution may increase in proportion to the quantity of view allocated to the panel image. Here, such a degradation of the 3D image may be reduced and/or prevented by adjusting the panel image. Thus, according to at least one embodiment, an operation of predicting the 3D image to be viewed by a user based on the panel image and an operation of adjusting the panel image to reduce a difference between a source image of the panel image and the 3D image may be performed. The operation of predicting a 3D image will be described with reference to FIG. 4.

Figure 4:
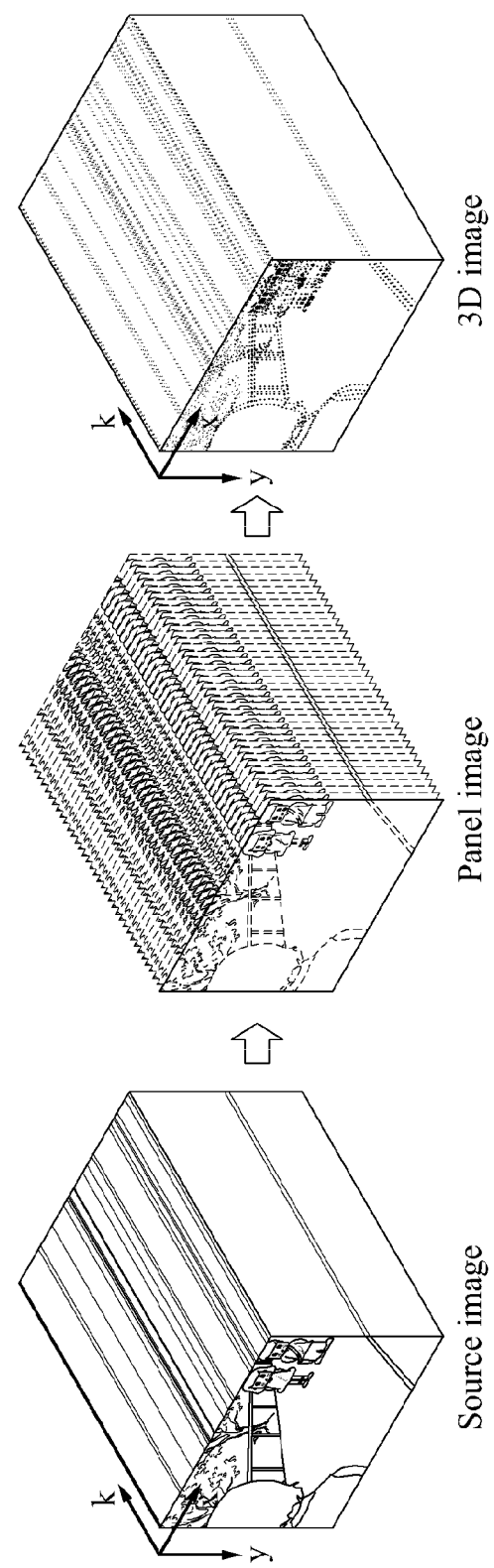
FIG. 4 illustrates an operation of predicting a 3D image according to at least one example embodiment.

FIG. 4 illustrates an operation of predicting a 3D image according to at least one example embodiment.

Referring to FIG. 4, a source image and a 3D image may be a light field image. The light field image indicates an image including multiple images corresponding to a plurality of views. For example, the light field image may include images corresponding to a preset number of views.

In coordinate axes illustrated in FIG. 4, a k-axis indicates a view, and x- and y-axes indicate coordinates of a pixel. For example, as illustrated in FIG. 4, an image included in an x-y plane in which a value of "k" is 1 indicates an image corresponding to a first view, and an image included in the x-y plane in which a value of k is 2 indicates an image corresponding to a second view. Thus, the source image that is the light field image may include two-dimensional (2D) images corresponding to a plurality of views. For example, the source image may include a first source image corresponding to the first view through a k-th source image corresponding to a k-th view. The source image includes an array of separate "source" 2D images of a scene, where each separate 2D image corresponds to a separate view of a plurality of views of the scene, such that the source image is a representation of an ideal 3D image of the scene. Through a light field, convenience and accuracy in generating and correcting the 3D image may be improved. For example, a 3D effect of a light field may be useful in converting a 2D image to a 3D image.

The 3D image is generated based on emitting a light field from a displayed panel image through an image converter such that the light field is split into separate visual fields corresponding to separate views of the 3D image. The 3D image (e.g., the plurality of views) that is generated based on emitting a light field from a displayed panel image through an image converter may be predicted based on the panel image. For example, the 3D image may be predicted based on an operation between the panel image and a convolution kernel. The convolution kernel may include a first function associated with a visual field of the panel image and a second function associated with spread of the panel image. The first function may include a view profile function and the second function may include a point spread function. The operation between the panel image and the convolution kernel may be referred to as a convolution operation. The first function and the second function will be described in detail with reference to FIG. 5A, FIG. 5B, FIG. 5C, FIG. 5D, and FIG. 5E.

An optimal panel image may be determined by comparing, to the source image, the 3D image predicted based on the panel image, and adjusting the panel image (e.g., adjusting one or more pixel values of one or more pixels of the panel image) to reduce (and/or minimize) a difference obtained by the comparing. That is, the panel image may be determined to allow the source image and the 3D image to be maximally similar to each other. To determine the optimal panel image, the predicting of the 3D image and the adjusting of the panel image may be iteratively performed. Although described later, a cost function may be used to compare the 3D image to the source image. In such a case, the optimal panel image may be a panel image that reduces (and/or minimizes) the cost function.

The panel image may be used to predict the 3D image, and thus an initial panel image may be determined through various methods. For example, the initial panel image may be determined based on the source image. In detail, the initial panel image may be determined based on a sample value for each visual field of the source image. In such an example, the initial panel image may include pixels sampled in the first source image through the k-th source image and allocated to the first view through the k-th view. The initial panel image may also be referred to as an initial value of the panel image. The initial panel image may be determined based on a known method of generating a 3D image. A source image may include an image for each visual field. An image for each visual field may be sampled based on a certain sampling rate. By rendering the sampled images into a single image, the initial panel image may be generated.

The initial panel image may be rendered based on a source image, and an optimal panel image may be generated based on iteratively processing the rendered panel image to generate a predicted 3D image and adjusting one or more pixel values of the panel image to reduce a determined difference between one or more views of the predicted 3D image and one or more corresponding views of the source image. A difference between views may be based on a difference between pixel values of corresponding pixels of one or more views of the predicted 3D image and one or more corresponding views of the source image.

FIG. 5A, FIG. 5B, FIG. 5C, FIG. 5D, and FIG. 5E illustrate a convolution kernel according to at least one example embodiment.

Figure 5A:
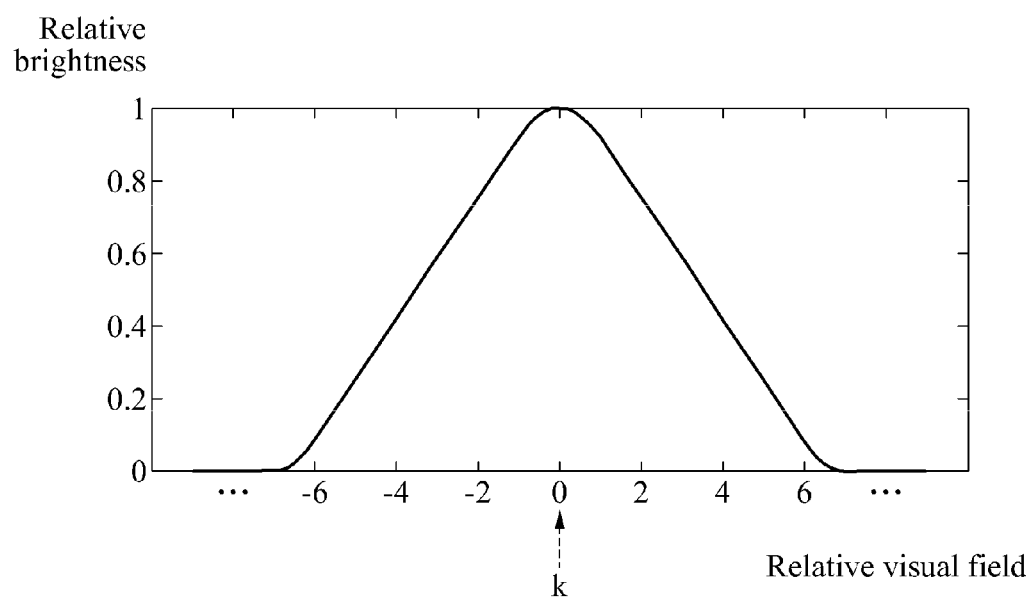
FIG. 5A, FIG. 5B, FIG. 5C, FIG. 5D, and FIG. 5E illustrate a convolution kernel according to at least one example embodiment.

FIG. 5A illustrates a first function associated with a visual field of a panel image. The first function may include a view profile function. An image in a visual field may be viewed along with an image in a neighboring visual field. The view profile function indicates a relative brightness of a neighboring visual field to be observed by a viewer located in a visual field. For example, when the viewer is located in a visual field "k," the view profile function may indicate at what brightness pixels in other visual fields are observed relative to a brightness of pixels in the visual field k. When the number of all visual fields included in a 3D image is N, the view profile function may indicate a relative brightness of pixels allocated to a visual field "(k+n) % N", wherein "%" denotes a modulo operator and "n" denotes an integer greater than or equal to 0 and less than or equal to N. In FIG. 5A, an x-axis indicates a relative visual field based on a visual field k, for example, 0, and a y-axis indicates a relative brightness based on the brightness of the visual field k.

In some example embodiments, the first function is a distribution of brightness of a pixel emitting a visual field as a function of a visual field in which the viewer is located. In some example embodiments, the first function is a normal distribution of brightness of a pixel emitting a visual field as a function of a visual field in which the viewer is located. In some example embodiments, the first function is a Gaussian distribution of brightness of a pixel emitting a visual field as a function of a visual field in which the viewer is located. The first function may be determined empirically based on determining brightness values of pixels displaying a visual field as a function of the visual field in which the viewer is located.

Figure 5B:
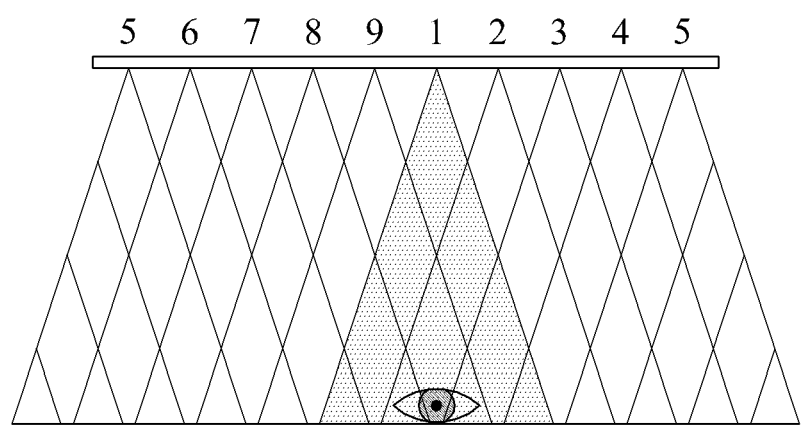
Figure 5C:
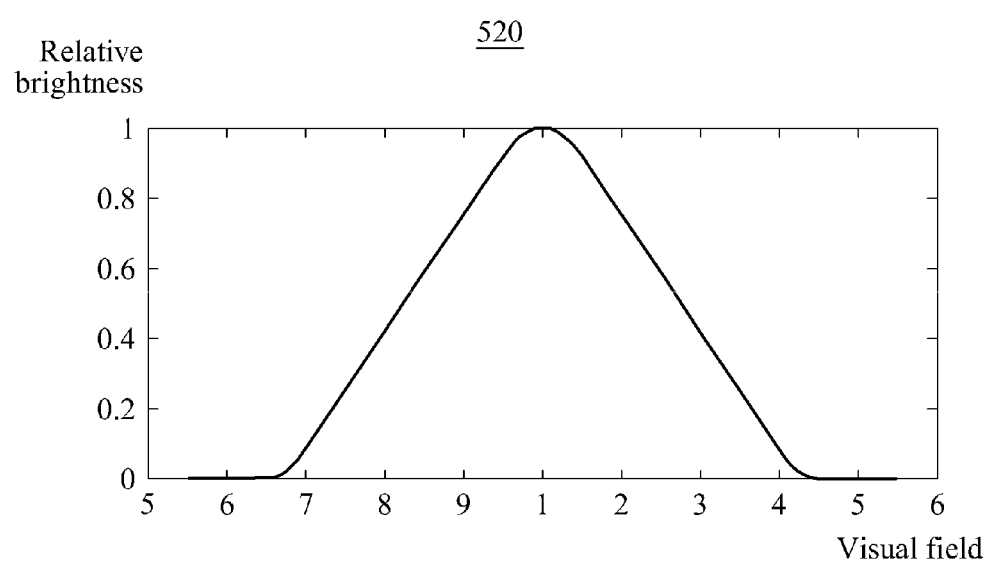

In detail, FIG. 5B illustrates a plurality of visual fields 510 when the number of all visual fields included in a 3D image is 9, and FIG. 5C illustrates a first function 520 when the number of all visual fields included in a 3D image is 9. The visual fields 510 include first through ninth visual fields. A viewer may view an image in a visual field among the visual fields 510 based on a location of an eye of the viewer. The image in the visual field may be viewed along with an image in another neighboring visual field. For example, when the viewer observes the first visual field, the second through fourth visual fields and the seventh through ninth visual fields may also be observed. When the number of views included in a 3D image increases, the number of neighboring visual fields to be observed by a viewer may increase.

The 3D image may be determined based on such a characteristic of an image output through an image converter. The view profile function may be designed to have a form similar to a normal distribution as in the first function 520. For example, the view profile function may be designed to have the form similar to the normal distribution by adjusting the number of all visual fields included in a 3D image and views to be allocated to each pixel of a display panel.

Figure 5D:
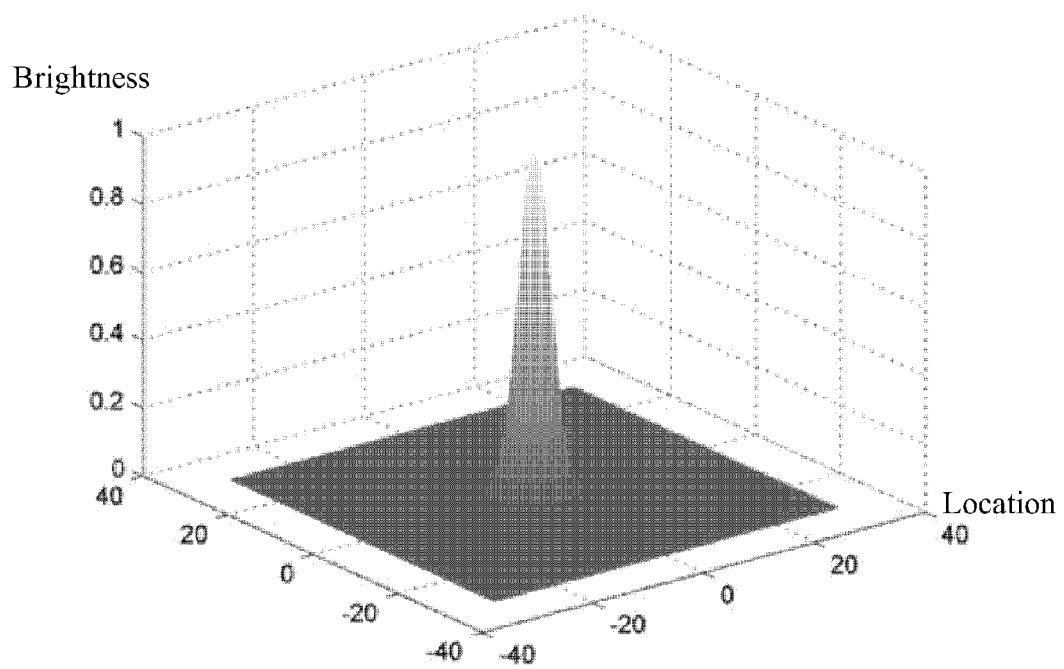

FIG. 5D illustrates a second function associated with spread of a panel image. The second function may include a point spread function. In FIG. 5D, an x-y plane indicates a relative location of a pixel and a z-axis indicates a relative brightness. As illustrated in FIG. 5D, light output from a point light source may be spread to surrounding areas. A 3D image may be determined based on such a characteristic of an image output through an image converter.

A 3D image corresponding to a panel image may be predicted through the convolution kernel described in the foregoing, and a quality of a 3D image to be actually output may be improved based on the predicted 3D image.

FIG. 5D shows a second function associated with a spread of a panel image. In some example embodiments, the second function illustrated in FIG. 5D is a distribution of pixel brightness as a function of relative distance from the pixel along a plane of the display panel (e.g., a distance from the pixel along an x,y plane where a distance from the display panel is a distance of 0 along a z axis that is normal to the display panel). In some example embodiments, the second function may be a Gaussian distribution of pixel brightness as a function of relative distance from the pixel along a plane of the display panel. The second function may be determined empirically based on determining brightness values of pixels displaying a visual field as a function of a distance along the x,y plane from the pixels, respectively.

Figure 5E:
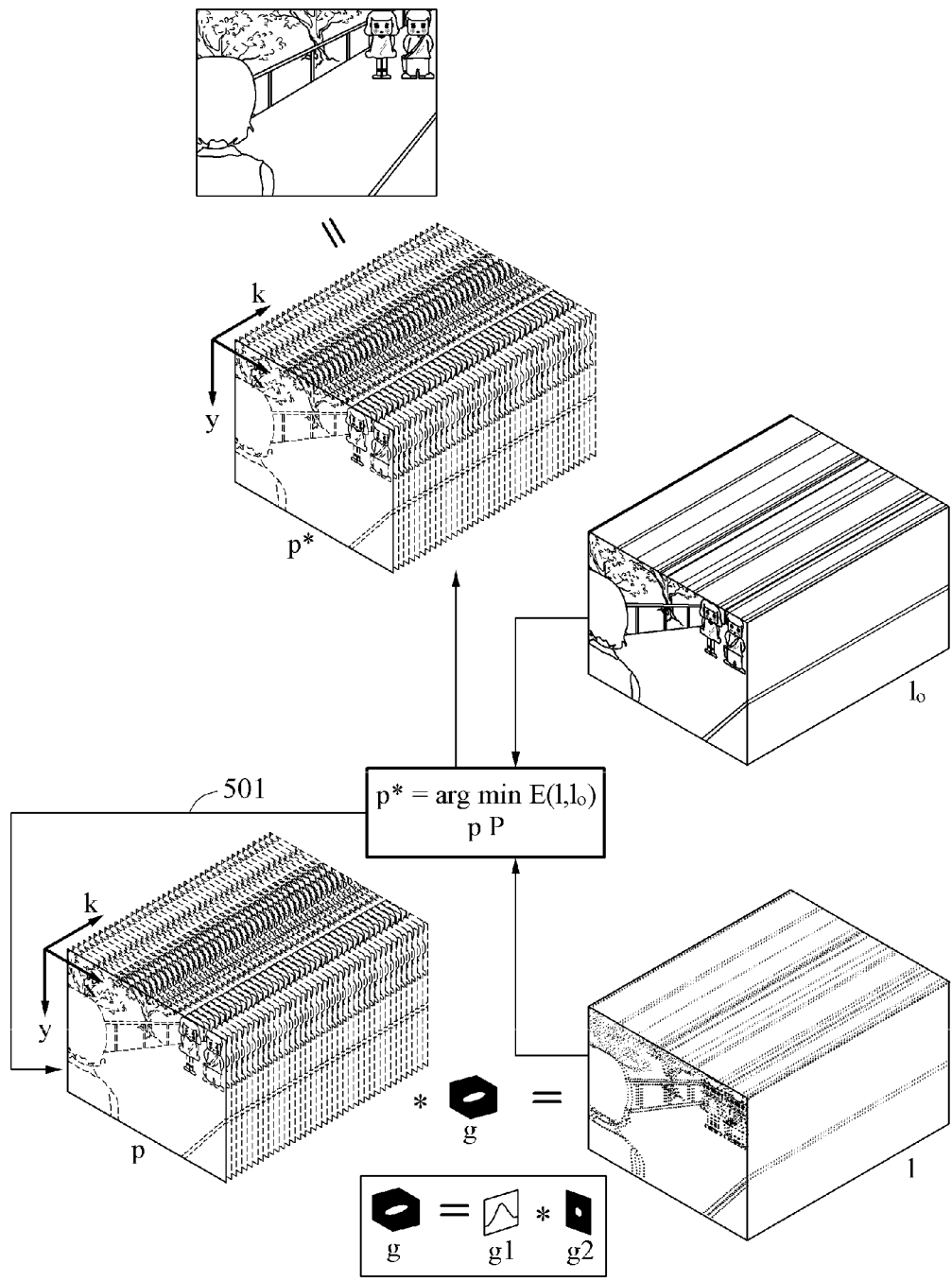

Referring to FIG. 5E, a 3D image l may be predicted through a convolution operation between a panel image p and a convolution kernel g. As referred to herein, "predicting" a 3D image includes generating a predicted 3D image, where the predicted 3D image includes an array of predicted plurality of views of the 3D image. A predicted 3D image may be generated based on applying a convolution kernel to a panel image in a "convolution operation," where the convolution kernel is a function of the first and second functions. The convolution kernel g may be determined through a convolution operation between a first function g1 and a second function g2, and the panel image p may be an initial panel image or a panel image determined through a previous iteration. Each of the first and second functions may be dependent upon the specific configuration, type, etc. of the image converter coupled to the display panel that may display the panel image. For example, a first and second function associated with an oblique crossing image inverter may be different from a first and second function associated with an aligned image converter.

As referred to herein, an image may include an array of pixel values corresponding to separate pixels of the image. In some example embodiments, each pixel value is one of a depth value, a brightness value, an RGB value, some combination thereof, or the like.

In some example embodiments, the convolution operation includes a simple multiplication of the convolution kernel and the panel image pixel values to arrive at the pixel values of the predicted 3D image. In some example embodiments, a convolution operation in a spatial domain may be converted to a multiplication operation in a frequency domain.

An optimal panel image p* may be determined ("rendered") by adjusting the rendered panel image p. For example, the optimal panel image p* may be determined by iteratively adjusting 501 the panel image p to reduce (and/or minimize) a difference between a source image $l_o$ and the 3D image l'. In detail, a 3D image l' may be predicted (e.g., a predicted 3D image l' may be generated) based on an initial panel image p', and the initial panel image p' may be adjusted to reduce (and/or minimize) a difference between the predicted 3D image l' and the source image $l_o$. Similarly, a 3D image l" may be predicted based on an adjusted panel image p", and the panel image p" may be re-adjusted to reduce (and/or minimize) a difference between the 3D image l" and the source image l0. Through such an iteration, the optimal panel image p* may be generated. The initial panel image p' may be determined ("generated") based on a known method of generating a 3D image based on a source image. For example, a source image may include an image for each visual field. An image for each visual field may be sampled based on a certain sampling rate. Based on rendering the sampled images into a single image, the initial panel image may be generated. As indicated above, the method for generating the initial panel image based on a source image, may be implemented according to well-known methods. Adjusting a panel image p may include changing one or more pixel values of one or more pixels of the panel image, where the one or more pixel values are adjusted based on a difference between pixel values of pixels of the predicted 3D image l and the pixel values of corresponding pixels of the source image $l_o$. The panel image p may be iteratively adjusted until a determined different between the source image and the 3D image l' is equal to or less than a threshold difference magnitude. In some example embodiments, the panel image p may be iteratively adjusted until a determined different between the source image and the 3D image l' is minimized.

The difference between the source image $l_o$ and the predicted 3D image l may be determined through various methods. For example, a cost function that determines the difference between the source image $l_o$ and the 3D image l may be defined, and the panel image p may be adjusted to reduce the difference between the source image l0 and the 3D image l using the cost function. An operation of minimizing a cost function will be described in detail with reference to FIG. 6.

Figure 6:
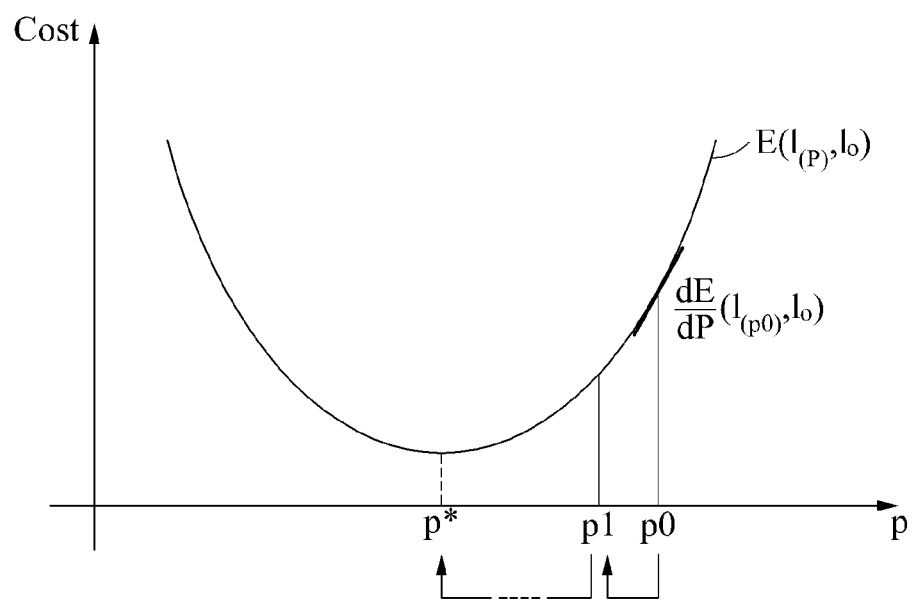
FIG. 6 is a diagram illustrating an operation of minimizing a cost function according to at least one example embodiment.

FIG. 6 is a diagram illustrating an operation of minimizing a cost function according to at least one example embodiment. In FIG. 6, an example of a cost function associated with a panel image is illustrated. The cost function illustrated in FIG. 6 may be defined as in Equation 1.

$$E(l, l_o) = \|l - l_o\|^2 \quad \text{[Equation 1]}$$

Equation 1 represents a cost function, also referred to herein as a first cost function, a first functional element, some combination thereof, or the like, as a least-squares error of the values of corresponding pixels of a predicted 3D image and a source image. In Equation 1, "E" denotes a cost function, and "l" and "$l_o$" denote a predicted 3D image and a source image, respectively. The cost function may include a least-squares error between the source image and the 3D image.

An image that reduces (and/or minimizes) the cost function may be determined to be an optimal panel image. For example, values of pixels included in a panel image may be adjusted to be values that reduce (and/or minimize) the cost function within an effective range between a minimum brightness and a maximum brightness.

Here, various optimization methods may be used to reduce (and/or minimize) the cost function. For example, a steepest descent method may be used to reduce (and/or minimize) the cost function. As described in the foregoing, the predicted 3D image may be a result of a convolution operation between the panel image and a convolution kernel, that is, l=p*g. Here, when performing a differentiation on Equation 1 with respect to "p," Equation 2 may be obtained.

$$\frac{d}{dp}E(l, l_o) = 2g^\dagger * (l - l_o) \quad \text{[Equation 2]}$$

In Equation 2, "g†" denotes a kernel obtained through a symmetry transform with respect to x-, y-, and z-axes. Here, the panel image p may be set to an initial value, and the panel image p may be subtracted from the initial value by a value of $$\mu \frac{d}{dp} E(l, l_o)$$

each time based on the steepest descent method. "μ" denotes a positive constant. Since the cost function and a limiting condition may be in a convex form, an optimal panel image p* that reduces (and/or minimizes) the cost function may be obtained by iteratively performing a clipping process on the panel image p under the limiting condition.

In FIG. 6, "p0," "p1," and "p*" denote an initial value, an intermediate value, and a final value of a panel image, respectively. According to at least one example embodiment, the initial value of the panel image may be determined based on a sampling value for each visual field of a source image. For example, the initial value of the panel image may be determined by applying a fractional view trick method to the source image. A relationship between p1 and p0 may be represented as Equation 3. Equation 3 illustrates an adjustment to be made to a panel image based on a difference between a predicted 3D image and a source image. The adjustment may include an adjustment to one or more pixel values of one or more panel image pixels.

$$p_1 = p_0 - \mu \frac{d}{dp} E(l_{p_0}, l_o) \quad \text{[Equation 3]}$$

In some example embodiments, Equation 3 is based on Equation 2. The final value of the panel image may be obtained by iteratively applying Equation 3. An optimal panel image may be developed (generated) based on iteratively developing (generating) a panel image from which a predicted 3D image has a minimal difference from the source image. The final value of the panel image indicates a value that reduces (and/or minimizes) the cost function. The steepest descent method is provided as an example, and thus various methods may be used to obtain a panel image that reduces (and/or minimizes) a cost function. A convolution operation in a time domain may be converted to a multiplication operation in a frequency domain, and thus the operation of minimizing a cost function may be more effectively performed.

The positive constant (μ) included in Equation 3 may be empirically determined.

According to at least one example embodiment, the cost function may be determined based on an artifact that may occur in the predicted 3D image. For example, the cost function may be defined as Equation 4.

$$E(l, l_o) = \|l - l_o\|^2 + \lambda f(l) \quad \text{[Equation 4]}$$

In Equation 4, "f(l)" denotes a cost function, also referred to herein as a second cost function, a second functional element, some combination thereof, or the like that is associated with an artifact such as a wave pattern or a moire that may occur in a predicted 3D image. A value of f(l) may be defined to increase an output value of f(l) as the artifact increases. "λ" denotes a regularization coefficient used to adjust a weighted value between both costs. The regularization coefficient may be determined empirically.

According to at least one example embodiment, the value of f(l) may be defined based on a total variation in values of pixels included in the predicted 3D image. The total variation indicates a sum of gradients for each pixel included in an image. Here, when performing a differentiation on Equation 4 with respect to "p," Equation 5 may be obtained.

$$\frac{d}{dp}E(l, l_o) = g^\dagger * \left(2(l - l_o) + \lambda \frac{d}{dl} f(l)\right) \quad \text{[Equation 5]}$$

In Equation 5, "g†" denotes a kernel obtained through a symmetry transform with respect to x-, y-, and z-axes. Here, the panel image p may be set to an initial value, and the panel image p may be subtracted from the initial value by $$\mu \frac{d}{dp} E(l, l_o)$$

a value of each time based on the steepest descent method. "μ" denotes a positive constant. Since the cost function and a limiting condition may be in a convex form, the optimal panel image p* that reduces (and/or minimizes) the cost function may be obtained by iteratively performing a clipping process on the panel image p under the limiting condition. Through Equations 4 and 5, an artifact such as a wave pattern adjacent to an edge component of the 3D image may be reduced.

Figure 7:
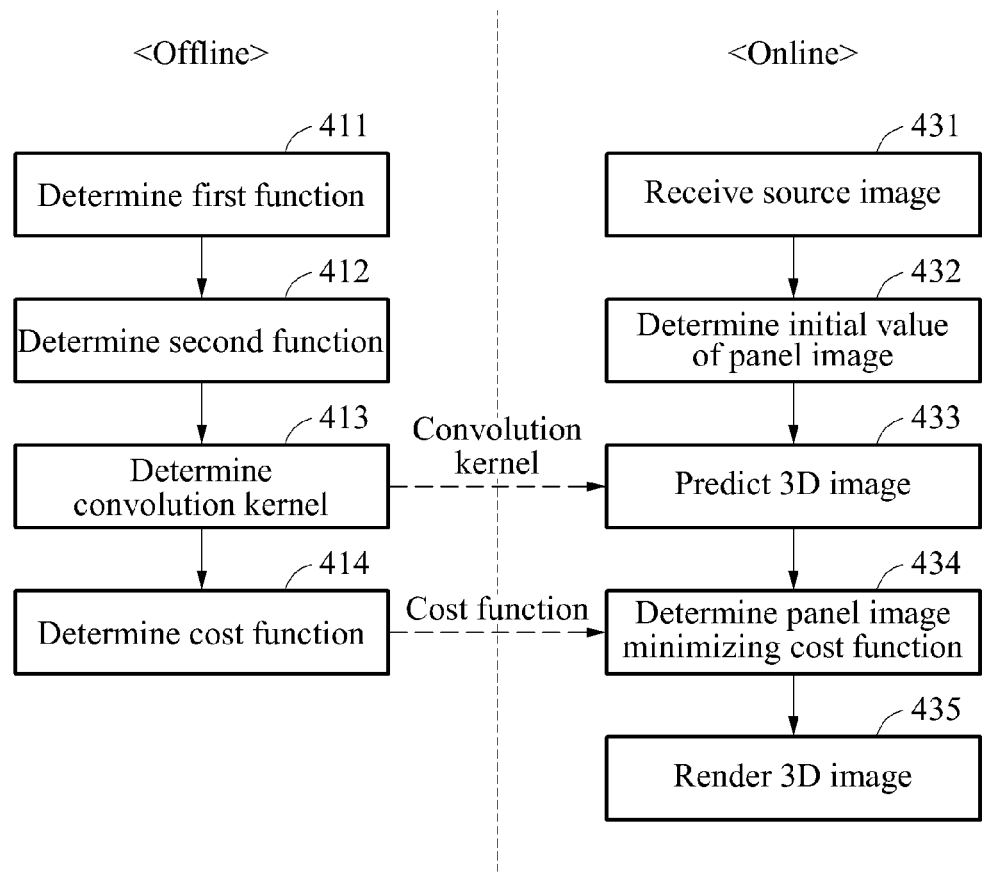
FIG. 7 is a flowchart illustrating a process of rending a 3D image based on a cost function determined offline according to at least one example embodiment.

FIG. 7 is a flowchart illustrating a process of rendering a 3D image based on a cost function determined offline according to at least one example embodiment. Referring to FIG. 7, in operation 411, a first function is determined. The first function is a function associated with a visual field of a panel image. In operation 412, a second function is determined. The second function is a function associated with spread of the panel image. Operations 411 and 412 may be performed sequentially or in parallel. As described later, the first function and the second function may vary depending on a viewing distance of a user. The first and the second functions in operations 411 and 412 may be determined based on a preset reference viewing distance. In operation 413, a convolution kernel is determined. The convolution kernel may be determined through a convolution operation between the first and the second functions. In operation 414, a cost function is determined. The cost function may be determined based on Equation 1 or Equation 4 described in the foregoing.

Operations 411 through 414 may be performed offline. Here, "offline" indicates a process of producing an image processing apparatus or a 3D display apparatus. Performing an operation "offline" may refer to performing the operation prior to receiving a source image and/or rendering a panel image based on the source image. Performing an operation "online" may refer to operations performed as part of receiving a source image and/or rendering a panel image based on the source image. In some example embodiments, performing an operation "offline" may refer to performing the operation at a stage at which a product is manufactured, and performing an operation "online" may refer to performing the operation at a stage at which the product is used by a user. Further, operations 411 through 414 may be performed by the processor 120 described with reference to FIG. 1 and a processor 330 to be described with reference to FIG. 8.

In operation 431, a source image is received. The source image may be received from a camera or a memory. The source image may also be received from an external device through a communication module. In operation 432, an initial value of a panel image is determined. The initial value of the panel image may be determined by applying a fractional view trick method to the source image. In operation 433, a 3D image is predicted using the initial value of the panel image. The 3D image may be predicted based on the convolution kernel determined in operation 413. In operation 434, a panel image that reduces (and/or minimizes) the cost function is determined. The cost function may be reduced (and/or minimized) based on at least one of Equations 2, 3, and 5. For example, in operation 434, the panel image may be adjusted to reduce the cost function based on the 3D image predicted in operation 433, for example, a 3D image 1', and a 3D image 1" may be predicted based on the adjusted panel image, and the adjusted panel image may be further adjusted to reduce the cost function based on the predicted 3D image 1". Such an operation may be iteratively performed.

In operation 435, the 3D image is rendered using the panel image that reduces (and/or minimizes) the cost function. Here, the rendering may include, for example, an operation of determining values of pixels or subpixels included in a display panel and an operation of generating an image to be displayed on the display panel. The 3D image may be rendered through the multi-view display method or the light field display method described in the foregoing. Operation 435 may refer to rendering the optimal panel image based upon which the 3D image is displayed if/when the optimal panel image is displayed on the display panel.

Operations 431 through 435 may be performed online. Here, "online" indicates a process of operating the image generating apparatus or the 3D display apparatus. Further, operations 431 through 435 may be performed by the processor 120 of FIG. 1 and the processor 330 of FIG. 8.

Figure 8:
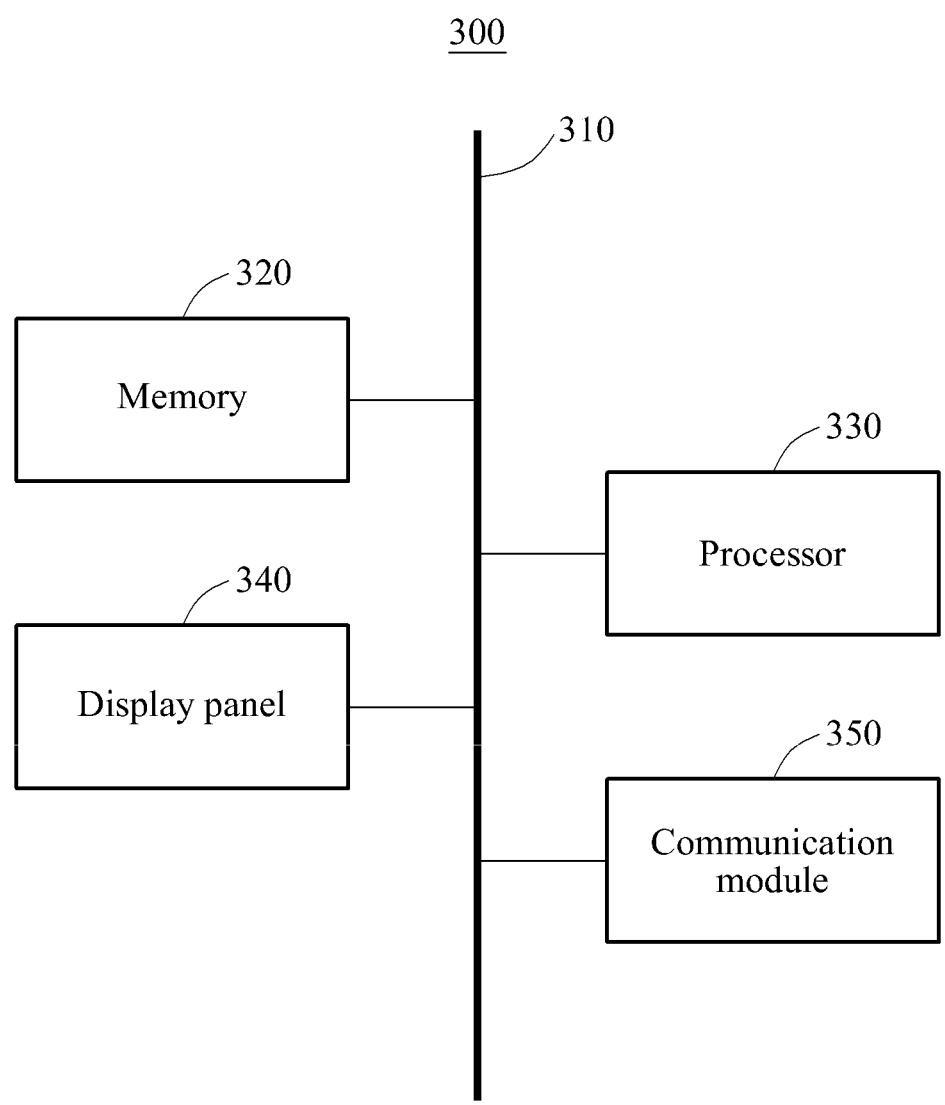
FIG. 8 is a diagram illustrating an image generating apparatus according to at least one example embodiment.

FIG. 8 is a diagram illustrating an image generating apparatus 300 according to at least one example embodiment. The image generating apparatus 300 shown in FIG. 8 may include some or the entire image generating apparatuses described herein. For example, the image generating apparatus 300 shown in FIG. 8 may include some or the entire image generating apparatus 100 shown in FIG. 1. Referring to FIG. 8, the image generating apparatus 300 includes a memory 320, a processor 330, a display panel 340, and a communication module 350. For example, the image generating apparatus 300 may be included in an Internet protocol television (IPTV). The memory 320, the processor 330, the display panel 340, and the communication module 350 may communicate with one another through a bus 310.

The communication module 350 may receive data from an external device using various Internet protocols. For example, the communication module 350 may receive a source image from the external device. The external device may include, for example, an image providing server, a mobile device such as, a mobile phone, a smartphone, a personal digital assistant (PDA), a tablet computer, and a laptop computer, a computing device such as a personal computer (PC), a tablet PC, and a netbook, an image outputting device such as a TV and a smart TV, and an image capturing device such as a camera and a camcorder. In some example embodiments, the image generating apparatus 300 may include one or more of an image providing server, a mobile device, a computing device, an image outputting device, and an image capturing device. A mobile device may include a mobile phone, a smartphone, a personal digital assistant (PDA), some combination thereof, or the like. A computing device may include a personal computer (PC), a tablet computer, a laptop computer, a netbook, some combination thereof, or the like. An image outputting device may include a TV, a smart TV, some combination thereof, or the like. An image capturing device may include a camera, a camcorder, some combination thereof, or the like.

The processor 330 may perform the operations described with reference to FIGS. 1 through 7 and operations to be described with reference to FIGS. 9 through 14. For example, the processor 330 may perform the operations described with reference to FIG. 7. The processor 330 may execute a program and control the image generating apparatus 300. A program code to be executed by the processor 330 may be stored in the memory 320. An electronic system may be connected to the external device through an input/output device (not shown) and exchange data with the external device.

The memory 320 may store the source image, a panel image, and a predicted 3D image, and data such as, for example, various functions, equations, and results of operations or calculations for the operations of the processor 330. In addition, the memory 320 may transmit the panel image, the source image of the panel image, and the predicted 3D image to the processor 330, or transmit other data stored in the memory 320 to the processor 330. The memory 320 may be a volatile or a nonvolatile memory. The memory 320 may be a non-transitory computer readable storage medium. The memory may store computer-readable instructions that, when executed, cause the execution of one or more methods, functions, processes, etc. as described herein. In some example embodiments, the processor 330 may execute one or more of the computer-readable instructions stored at the memory 320.

The display panel 340 may output a panel image that reduces (and/or minimizes) a cost function. The panel image determined by the processor 330 may be output by the display panel 340 and converted to a 3D image by an image converter.

In some example embodiments, elements 340 and 350 may be absent from apparatus 300. For example, apparatus 300 may include a dongle that further includes a communication interface that may communicatively couple at least the processor to a 3D display apparatus 200, such that the apparatus 300 may provide a panel image to the 3D display apparatus 200 to display on the display panel 210 thereof. The communication interface may include a USB and/or HDMI interface. The dongle may include the memory 320 and processor 330 but not the communication module 350 or the display panel 340.

Figure 9:
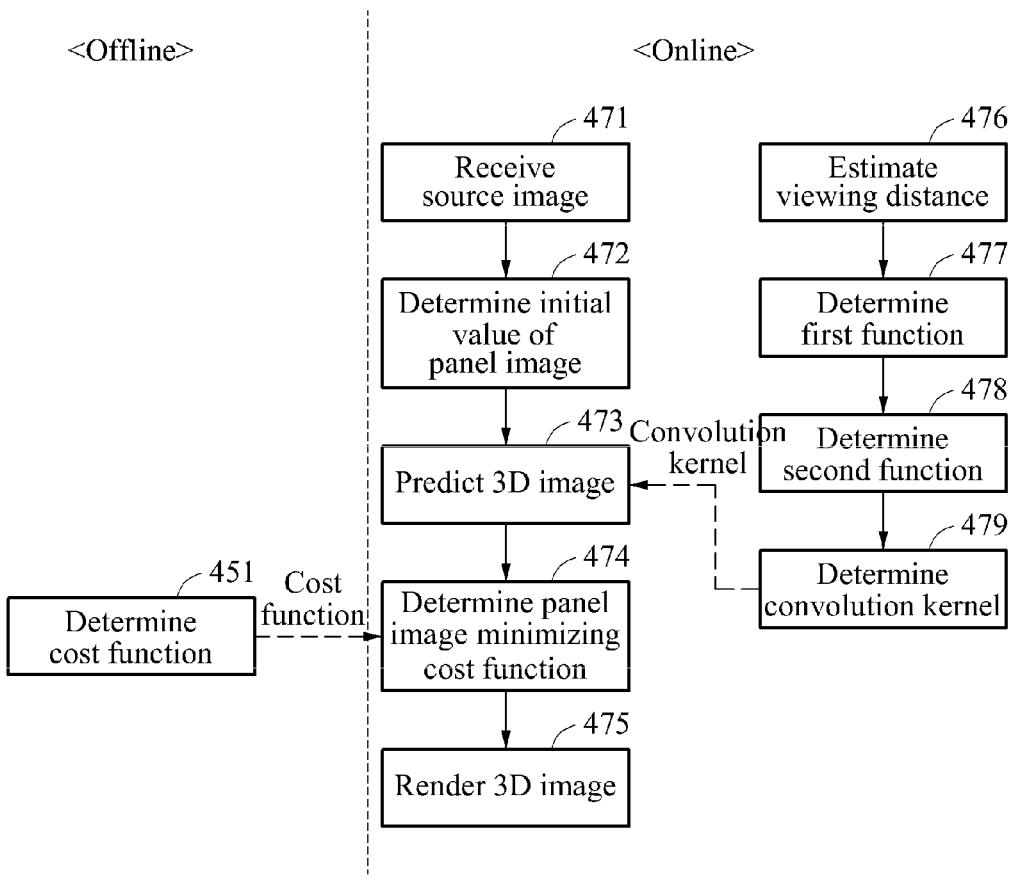
FIG. 9 is a flowchart illustrating a process of rending a 3D image based on a viewing distance according to at least one example embodiment.

FIG. 9 is a flowchart illustrating a process of rending a 3D image based on a viewing distance according to at least one example embodiment. Referring to FIG. 9, in operation 451, a cost function is determined. Operation 451 may be performed offline. Operation 451 may be performed by the processor 120 described with reference to FIG. 1 and the processor 330 described with reference to FIG. 8.

In operation 471, a source image is received. In operation 472, an initial value of a panel image is determined. In operation 473, a 3D image is predicted using the initial value of the panel image. The 3D image may be predicted based on a convolution kernel determined in operation 479. In operation 474, a panel image that reduces (and/or minimizes) the cost function is determined. In operation 475, the 3D image is rendered using the panel image minimizing the cost function. The details described with reference to FIG. 7 may be applicable to operations 471 through 475.

In operation 476, a viewing distance is estimated. The viewing distance (also referred to as an "orthogonal viewing distance") may be a distance of one or more of a user's eyes from the display panel. For example, the viewing distance may be estimated based on a location of an eye of a user identified by a camera. The camera may include various types of sensors, for example, a vision sensor and an infrared sensor. A first function and a second function may vary depending on the viewing distance. In some example embodiments, one or more of the first function and the second function is a Gaussian distribution in parallel with the display panel and varies inversely in magnitude linearly with regard to orthogonal distance from the display panel. Adjusting a convolution function based on the viewing distance of the user may improve a quality of the 3D image. An operation of determining of the convolution kernel based on the viewing distance will be described with reference to FIGS. 10 and 11.

Figure 10:
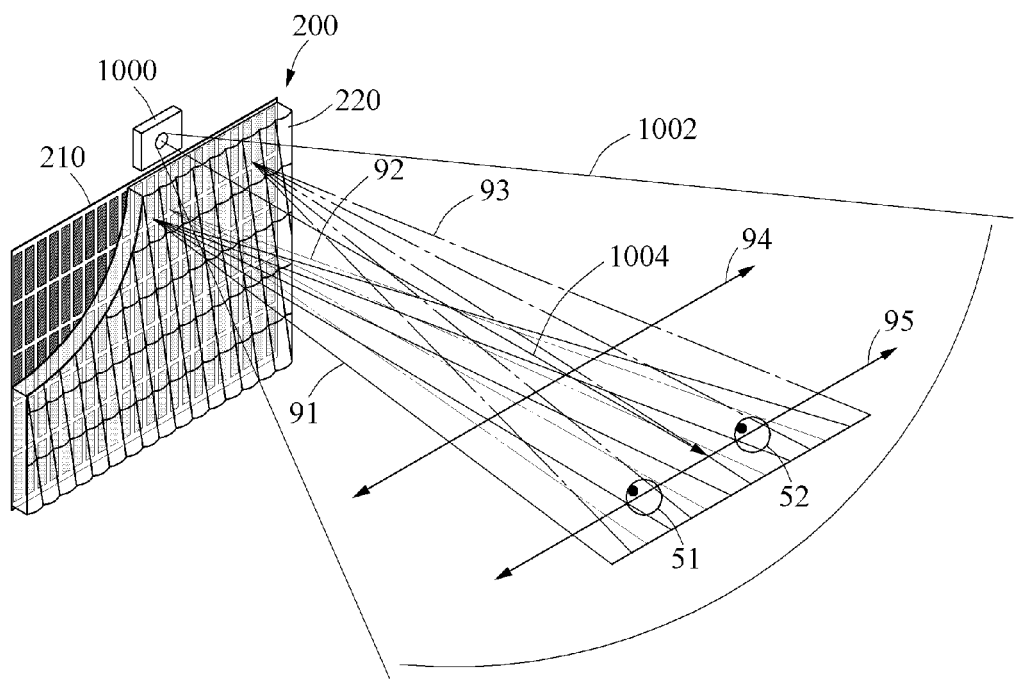
FIG. 10 is a diagram illustrating a change in a visual field depending on a viewing distance according to at least one example embodiment.

FIG. 10 is a diagram illustrating a change in a visual field depending on a viewing distance according to at least one example embodiment. Referring to FIG. 10, a first ray 91, a second ray 92, and a third ray 93 are output through the display panel 210 and the image converter 220 of FIG. 1.

The first ray 91, the second ray 92, and the third ray 93 may be included in a 3D image to be output through the display panel 210 and the image converter 220. As described in the foregoing, images of different views may be viewed in a visual field corresponding to a view. For example, images of views adjacent to a first view may be viewed in a first visual field. A neighboring view to be viewed may vary based on a viewing distance. For example, as illustrated in FIG. 10, an image of a neighboring view to be viewed in the first visual field at a location 94 may be different from an image of a neighboring view to be viewed in the first visual field at a location 95.

Locations 94 and 95 correspond to different orthogonal distances ("viewing distances") 1004 from the pixels 211 of the display panel 210.

In some example embodiments, the 3D display apparatus 200 includes a camera sensor 1000. The camera sensor 1000 may be configured to capture images of a field of view 1002. As shown in FIG. 10, if and/or when one or more user eyes 51, 52 are located within the field of view 1002, the camera sensor 100 may capture one or more images of the one or more user eyes 51, 52. The apparatus 200 may process one or more captured images of the one or more user eyes 51, 52 to determine the location 94, 95 at which a user's eyes 51, 52 are locate, thereby determining the magnitude of the viewing distance 1004.

In some example embodiments, the viewing distance 1004 may be determined based on a lookup table that associates determined user eyes and/or facial features in a captured image of the field of view 1002 with a corresponding distance 1004 value (magnitude") located in an array of a lookup table. The distance 1004 values in the array may be determined empirically.

A first function associated with a visual field of a panel image may be determined based on the viewing distance. For example, when the graph of FIG. 5A is drawn with respect to the location 94, a graph of the first function with respect to the location 95 may have a broader or a narrower form than the graph of FIG. 5A depending on a design of the display panel 210 and the image converter 220. The viewing distance 1004 may be used to determine a second function. An operation of determining the second function based on the viewing distance will be described in detail with reference to FIG. 11.

In some example embodiments, an optimal panel image may be dynamically adjusted according to dynamic adjustments to the first and second functions. The determined first and second functions may vary dynamically according to dynamic changes in the determined viewing distance 1004. The determined viewing distance 1004 may be dynamically adjusted based on processing a stream of images generated by one or more camera sensors. In some example embodiments, one or more of the first and second functions may be adjusted according to the determined viewing distance, and predicted 3D images may be generated according to the adjusted first and second functions.

Such adjustment of the first and second functions may be dynamic, based on changes in the viewing distance 1004. For example, the camera sensor 1002 may repeatedly capture images of the field of view 1002, and the viewing distance 1004 may be repeatedly recalculated according to processing the repeatedly captured images of the field of view. At least one of the first and second functions may be readjusted according to successive recalculations of the viewing distance 1004. The predicted 3D image may be recalculated according to adjustments to at least one of the first and second functions. Accordingly, in some example embodiments, the optimal panel image may be dynamically adjusted according to dynamic adjustments to at least one of the first and second functions, where such dynamic adjustments are based on dynamic changes in the determined viewing distance 1004.

Figure 11:
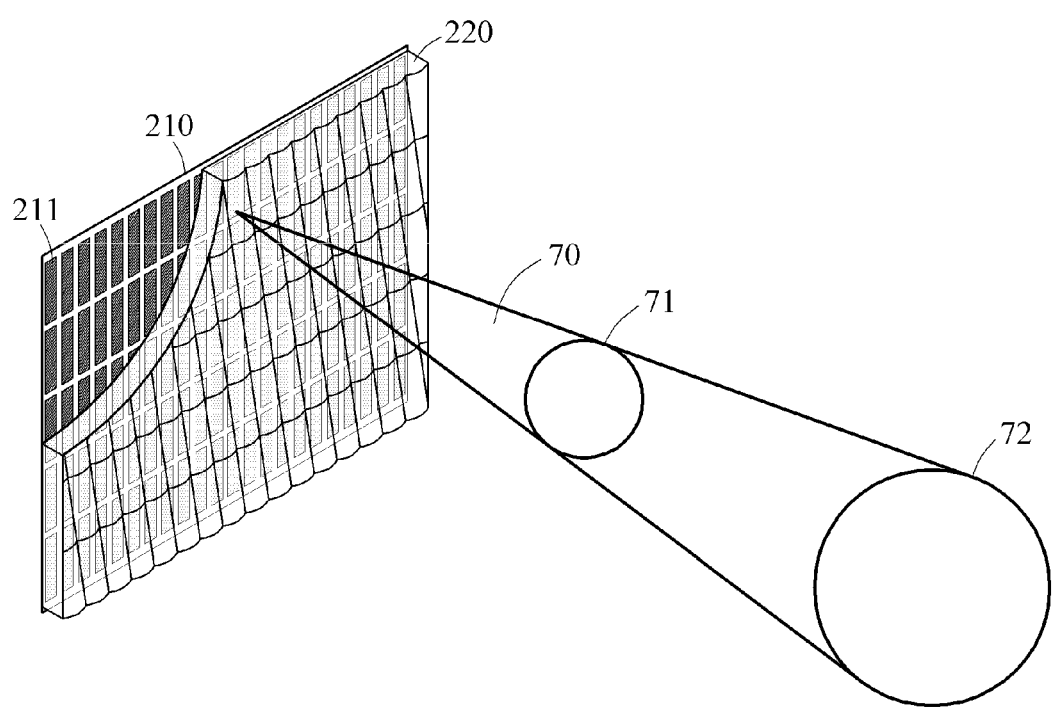
FIG. 11 is a diagram illustrating spread of light according to at least one example embodiment.

FIG. 11 is a diagram illustrating spread of light according to at least one example embodiment. Referring to FIG. 11, a first ray 70 is output through the display panel 210 and the image converter 220 of FIG. 1. The first ray 70 may be included in a 3D image to be output through the display panel 210 and the image converter 220. In some example embodiments, ray 70 is a visual field emitted by the image converter 220 from light emitted by one or more pixels 211 of the display panel 210.

The first ray 70 may be output from any one of pixels of the display panel 210. The first ray 70 may be spread as the first ray 70 goes farther from the image converter 220. For example, a degree of spread of the first ray 70 at a location 72 may be greater than a degree of spread of the first ray 70 at a location 71. Thus, the second function associated with spread of a panel image may be determined based on a viewing distance. For example, when the graph of FIG. 5B is drawn with respect to the location 71, a graph of the second function with respect to the location 72 may have a form spreading as a value of z decreases. The "spread" of light in ray 70 at a location may refer to a size of the visual field corresponding to ray 70 at that location.

Referring back to FIG. 9, in operation 477, the first function is determined. In operation 478, the second function is determined. In operations 477 and 478, the first and the second functions are determined based on the viewing distance estimated in operation 476. Operations 477 and 478 may be performed sequentially or in parallel. In operation 479, the convolution kernel is determined. The convolution kernel may be determined based on the convolution operation between the first and the second functions.

Operations 471 through 475 may be performed online. Operations 471 through 475 may be performed by the processor 120 described with reference to FIG. 1 and the processor 330 described with reference to FIG. 8.

Figure 12:
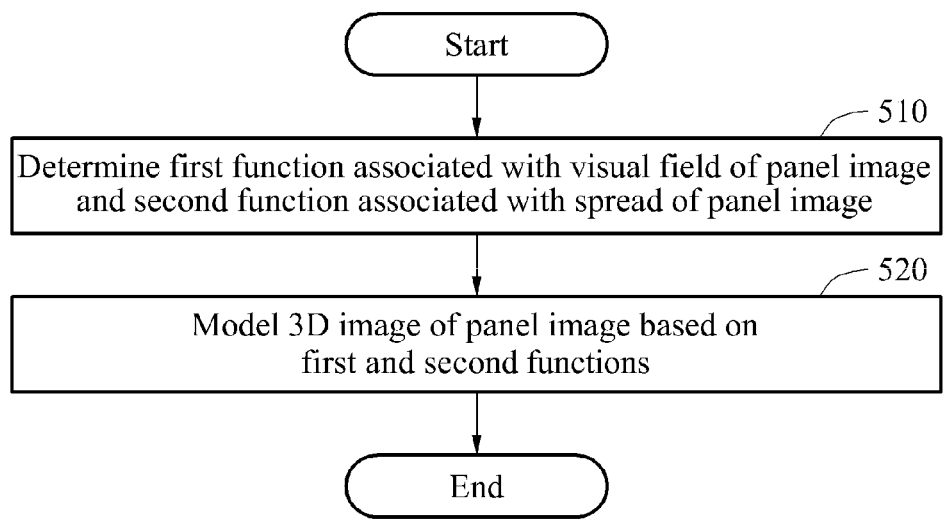
FIG. 12 is a flowchart illustrating a method of modeling a 3D image according to at least one example embodiment.

FIG. 12 is a flowchart illustrating a method of modeling a 3D image according to at least one example embodiment. Referring FIG. 12, in operation 510, a first function associated with a visual field of a panel image and a second function associated with spread of the panel image are determined. The operation 510 of FIG. 12 may encompass operations 411, 412 of FIG. 7 and operations 477, 478 of FIG. 9. In operation 520, a 3D image of the panel image is modeled based on the first and the second functions. The operation 520 of FIG. 12 may encompass operations 413, 433 of FIG. 7 and operations 479, 473 of FIG. 9. Here, the modeling indicates operations performed to predict the 3D image and improve a quality of the 3D image as described in the foregoing. For example, the modeling may include, for example, determining a source image, determining the panel image, predicting the 3D image, and adjusting the panel image based on a cost function. Operations 510 and 520 may be performed by the processor 120 described with reference to FIG. 1 and the processor 330 described with reference to FIG. 8. The processor 120 and the processor 330 may perform operations related to operations 510 and 520 among the operations described in the foregoing.

Figure 13:
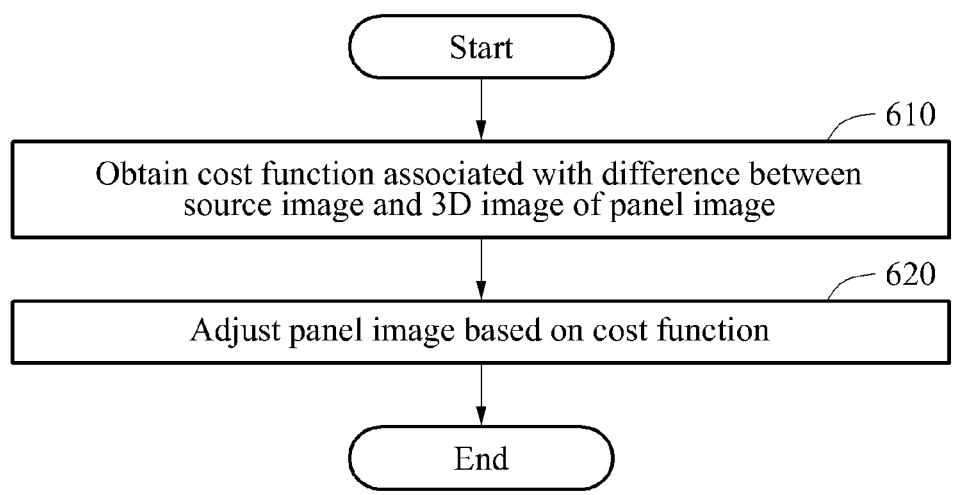
FIG. 13 is a flowchart illustrating a process of adjusting a panel image according to at least one example embodiment.

FIG. 13 is a flowchart illustrating a process of adjusting a panel image according to at least one example embodiment. Referring to FIG. 13, in operation 610, a cost function associated with a difference between a source image of a panel image and a 3D image of the panel image is determined. The operation 610 of FIG. 13 may encompass operations 414 of FIG. 7 and 451 of FIG. 9. In operation 620, the panel image is adjusted based on the cost function. The operation 620 of FIG. 13 may encompass operations 434 of FIG. 7 and 474 of FIG. 9. Operations 610 and 620 may be performed by the processor 120 described with reference to FIG. 1 and the processor 330 described with reference to FIG. 8. The processor 120 and the processor 330 may perform operations related to operations 610 and 620 among the operations described in the foregoing.

Figure 14:
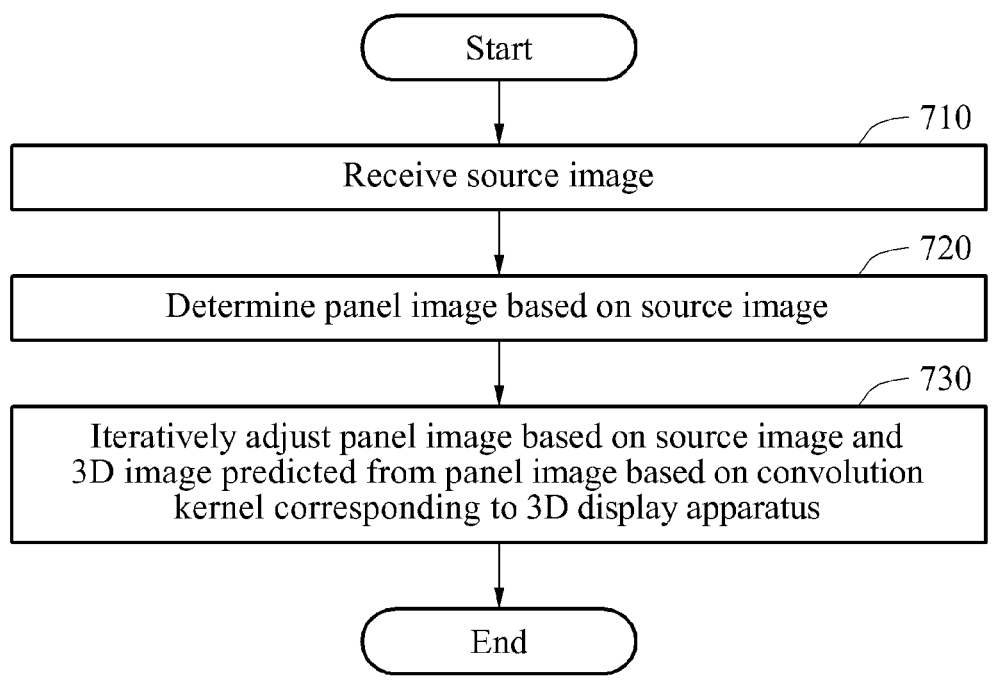
FIG. 14 is a flowchart illustrating another process of adjusting a panel image according to at least one example embodiment.

FIG. 14 is a flowchart illustrating another process of adjusting a panel image according to at least one example embodiment. Referring to FIG. 14, in operation 710, a source image for a 3D image is received. The source image may be received through the communication module 350 described with reference to FIG. 8. Alternatively, the source image may be received by the processor 330 of FIG. 8 from the communication module 350 through the bus 310 of FIG. 8. The operation 710 of FIG. 14 may encompass operations 431 of FIG. 7 and 471 of FIG. 9. In operation 720, an initial value of a panel image is determined based on the source image. The operation 720 of FIG. 14 may encompass operations 432 of FIG. 7 and 472 of FIG. 9. In operation 730, the panel image is iteratively adjusted based on the source image and the 3D image of the panel image predated based on a convolution kernel corresponding to a 3D display apparatus. The operation 730 of FIG. 14 may encompass operations 433, 434 of FIG. 7 and 473, 474 of FIG. 9. Operations 720 and 730 may be performed by the processor 120 described with reference to FIG. 1 and the processor 330. The processor 120 and the processor 330 may perform operations related to operations 710 through 730 among the operations described in the foregoing.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An image generating method, comprising:
   determining a first function associated with a brightness distribution of one or more visual fields of a two-dimensional (2D) panel image;
   determining a second function associated with a distribution of brightness of a panel image pixel based on distance from the panel image pixel; and
   predicting a three-dimensional (3D) image based on a convolution operation between 3D samples of the panel image and a convolution kernel,
   wherein the convolution kernel is determined based on the first function and the second function, and
   wherein the 3D samples of the panel image are determined by sampling pixels for each visual field.

2. The method of claim 1, wherein the panel image includes a plurality of panel image pixels emitting a plurality of visual fields.

3. The method of claim 2, wherein the first function includes a normal distribution of observed panel image pixel relative brightness based on observed visual field of the plurality of visual fields.

4. The method of claim 1, wherein,
   the panel image is generated based on a source image, the source image including a plurality of images corresponding to the plurality of visual fields;
   the method further includes adjusting one or more panel image pixel values of the panel image based on a difference between one or more pixel values of the source image and one or more pixel values of the 3D image.

5. The method of claim 1, wherein the 3D image includes a plurality of images corresponding to separate visual fields of the panel image.

6. The method of claim 1, further comprising:
   adjusting one or more pixel values of the panel image to reduce a determined difference between pixel values of the source image and pixel values of the 3D image.

7. The method of claim 1, wherein the first function includes a view profile function.

8. The method of claim 1, wherein the second function includes a point spread function.

9. An image generating method, comprising:
   obtaining a first cost function associated with a difference between pixel values of a source image of a two-dimensional (2D) panel image and pixel values of a three-dimensional (3D) image of the panel image; and
   adjusting one or more pixel values of the panel image based on the first cost function to reduce a difference between the pixel values of the source image and the pixel values of the 3D image,
   wherein the 3D image is predicted based on a convolution operation between a 3D samples of the panel image and a convolution kernel, the convolution kernel being determined based on a first function associated with a brightness distribution of one or more visual fields of the panel image, and a second function associated with a distribution of brightness of a panel image pixel based on distance from the panel image pixel.

10. The method of claim 9, wherein the adjusting of the panel image includes,
    adjusting values of pixels comprised in the panel image to reduce the first cost function.

11. The method of claim 9, wherein the first cost function includes a least-squares error between the pixel values of the source image and the pixel values of the 3D image.

12. The method of claim 9, wherein the first cost function includes a second cost function associated with an artifact in the 3D image.

13. The method of claim 12, wherein the second cost function is determined based on a variation in pixel values of the 3D image.

14. The method of claim 9, wherein the source image includes separate sets of images, each set of images being associated with separate viewing distances from a display apparatus displaying the one or more visual fields.

15. The method of claim 9, further comprising:
    determining initial pixel values of the panel image based on sampling pixel values of each visual field of the source image.

16. The method of claim 9, wherein the first function includes a view profile function.

17. The method of claim 9, wherein the second function includes a point spread function.

18. An image generating method, comprising:
    receiving a source image, the source image including a plurality of visual fields;
    rendering a two-dimensional (2D) panel image based on the source image; and
    iteratively adjusting pixel values of the panel image based on pixel values of the source image and a 3D image of the panel image,
    wherein the 3D image is predicted based on a convolution operation between a 3D samples of the panel image and a convolution kernel, the convolution kernel being determined based on a first function associated with a brightness distribution of one or more visual fields of the panel image, and a second function associated with a distribution of brightness of a panel image pixel based on distance from the panel image pixel.

19. The method of claim 18, wherein the panel image includes a plurality of panel image pixels emitting the plurality of visual fields, and the first function includes a normal distribution of observed panel image pixel relative brightness based on observed visual field of the plurality of visual fields.

20. The method of claim 18, wherein the iteratively adjusting of the panel image includes
adjusting one or more pixel values of the panel image to reduce a determined difference between pixel values of the source image and pixel values of the 3D image.

21. The method of claim 18, wherein the rendering of the panel image based on the source image includes
determining initial pixel values of the panel image based on applying a fractional view trick method to the source image.

22. The method of claim 18, wherein the iteratively adjusting of the panel image includes
adjusting one or more pixel values of the panel image to reduce a cost function associated with a difference between pixel values of the source image and pixel values of the 3D image.

23. The method of claim 22, wherein the cost function includes at least one of,
a first functional element associated with a least-squares error between the pixel values of the source image and the pixel values of the 3D image, and
a second functional element associated with an artifact in the 3D image.

24. The method of claim 18, further comprising:
estimating a viewing distance of a user from a display apparatus displaying the panel image; and
determining the convolution kernel based on the estimated viewing distance.

25. An image generating apparatus, comprising:
a memory configured to store an individual two-dimensional (2D) panel image, the panel image including a plurality of panel image pixels emitting a plurality of visual fields; and
a processor configured to,
determine a cost function associated with a difference between pixel values of a source image and pixel values of a three-dimensional (3D) image of the panel image, and
adjust one or more pixel values of the panel image based on the determined cost function,
wherein the 3D image is predicted based on a convolution operation between 3D samples of the panel image and a convolution kernel, the convolution kernel being determined based on a first function associated with a brightness distribution of one or more visual fields of the panel image, and a second function associated with a distribution of brightness of a panel image pixel based on distance from the panel image pixel.

26. The apparatus of claim 25, wherein the processor is configured to adjust one or more pixel values of the panel image to reduce the difference between pixel values of the source image and pixel values of the 3D image of the panel image.

27. The apparatus of claim 25, wherein the cost function includes at least one of,
a first function associated with a least-squares error between the pixel values of the source image and the pixel values of the 3D image, and
a second function associated with an artifact in the 3D image.

28. The apparatus of claim 27, wherein the second function is determined based on a variation in pixel values of the 3D image.

29. The apparatus of claim 25, wherein the source image includes separate sets of images, each set of images being associated with separate viewing distances from a display apparatus displaying the visual fields.

30. The apparatus of claim 25, wherein the processor is configured to determine initial pixel values of the panel image based on sampling pixel values of each visual field of the source image.

31. The apparatus of claim 25, wherein the first function includes a view profile function and the second function includes a point spread function.

32. An image generating apparatus, comprising:
a communication module configured to receive a source image, the source image including a plurality of visual fields; and
a processor configured to,
render a two-dimensional (2D) panel image based on the source image, and
iteratively adjust pixel values of the panel image based on pixel values of the source image and a 3D image of the panel image,
wherein the 3D image is predicted based on a convolution operation between 3D samples of the panel image and a convolution kernel, the convolution kernel being determined based on a first function associated with a brightness distribution of one or more visual fields of the panel image, and a second function associated with a distribution of brightness of a panel image pixel based on distance from the panel image pixel.

33. The apparatus of claim 32, wherein the processor is configured to adjust one or more pixel values of the panel image to reduce a cost function associated with a difference between pixel values of the source image and pixel values of the 3D image.

34. The apparatus of claim 33, wherein the cost function includes at least one of,
a first functional element associated with a least-squares error between the pixel values of the source image and the pixel values of the 3D image, and
a second functional element associated with an artifact in the 3D image.

35. The apparatus of claim 32, wherein the processor is configured to
estimate a viewing distance of a user from a display apparatus displaying the panel image, and
determine the convolution kernel based on the estimated viewing distance.

36. An apparatus, comprising:
a memory storing computer-readable instructions; and
a processor configured to execute the computer-readable instructions to
determine a first function associated with a brightness distribution of one or more visual fields of a two-dimensional (2D) panel image;
determine a second function associated with a distribution of brightness of a panel image pixel based on distance from the panel image pixel; and
predict a three-dimensional (3D) image based on a convolution operation between 3D samples of the panel image and a convolution kernel,
wherein the convolution kernel is determined based on the first function and the second function, and
wherein the 3D samples of the panel image are determined based on sampling pixels for each visual field.

37. The apparatus of claim 36, wherein the processor is configured to execute the computer-readable instructions to estimate a viewing distance of a user from a display apparatus configured to display the panel image, based on one or more images generated by a camera sensor; and determine at least one of the first function and the second function based on the estimated viewing distance.

38. The apparatus of claim 37, wherein the processor is configured to execute the computer-readable instructions to dynamically adjust the estimated viewing distance based on processing a stream of images generated by the camera sensor; and dynamically adjust at least one of the first function and the second function based on the dynamically adjusted estimated viewing distance.

* * * * *